(12) United States Patent
Vinciarelli et al.

(10) Patent No.: US 9,166,481 B1
(45) Date of Patent: Oct. 20, 2015

(54) DIGITAL CONTROL OF RESONANT POWER CONVERTERS

(71) Applicant: VLT, INC., Sunnyvale, CA (US)

(72) Inventors: Patrizio Vinciarelli, Boston, MA (US); Sergey Luzanov, Pelham, NH (US)

(73) Assignee: VLT, INC., Sunnyvale, CA (US)

( * ) Notice: Subject to any disclaimer, the term of this patent is extended or adjusted under 35 U.S.C. 154(b) by 308 days.

(21) Appl. No.: 13/830,262

(22) Filed: Mar. 14, 2013

(51) Int. Cl.
*H02M 3/335* (2006.01)
*H02M 3/325* (2006.01)

(52) U.S. Cl.
CPC .................................. *H02M 3/325* (2013.01)

(58) Field of Classification Search
CPC ............ H02M 3/335; H02M 3/33515; H02M 3/33592
USPC ......... 363/17, 21.02, 21.03, 21.05, 21.06, 98, 363/132
See application file for complete search history.

(56) References Cited

U.S. PATENT DOCUMENTS

| | | | |
|---|---|---|---|
| 5,010,261 A | | 4/1991 | Steigerwald |
| 5,267,138 A | * | 11/1993 | Shores ............................ 363/98 |
| 6,107,860 A | | 8/2000 | Vinciarelli |
| 6,911,848 B2 | | 6/2005 | Vinciarelli |
| 6,930,893 B2 | | 8/2005 | Vinciarelli |
| 6,934,166 B2 | | 8/2005 | Vinciarelli |
| 6,975,098 B2 | | 12/2005 | Vinciarelli |
| 6,984,965 B2 | | 1/2006 | Vinciarelli |
| 7,091,753 B2 | | 8/2006 | Inoshita |
| 7,145,786 B2 | | 12/2006 | Vinciarelli |
| 7,193,866 B1 | * | 3/2007 | Huang et al. .................... 363/22 |
| 7,602,229 B2 | | 10/2009 | Tolle et al. |
| 8,174,851 B2 | * | 5/2012 | Elferich ..................... 363/21.02 |
| 2011/0194206 A1 | * | 8/2011 | Sase et al. ....................... 360/75 |
| 2013/0314951 A1 | * | 11/2013 | Harrison ................... 363/21.02 |

* cited by examiner

*Primary Examiner* — Matthew Nguyen
(74) *Attorney, Agent, or Firm* — Foley & Lardner LLP

(57) ABSTRACT

A method of synchronously operating a power converter in a series of converter operating cycles includes providing an oscillator for generating clock signals at an oscillator frequency, and generating timing control signals for each of multiple events based upon the clock signals. The method further includes to: (i) turn a primary switch ON and OFF at times when essentially zero voltage is impressed across the primary switch and essentially zero resonant current is flowing in the primary switch; and (ii) turn a secondary switch ON and OFF at times when essentially zero current is flowing in the secondary switch and essentially zero voltage is impressed across the secondary switch. The oscillator frequency is preset, and the timing of the timing control signals for one or more selected events may be set independently of other timing control signals and events.

35 Claims, 14 Drawing Sheets

Half Bridge
Primary Clamp

Full Bridge
Primary Clamp

Secondary Clamp
Full Bridge

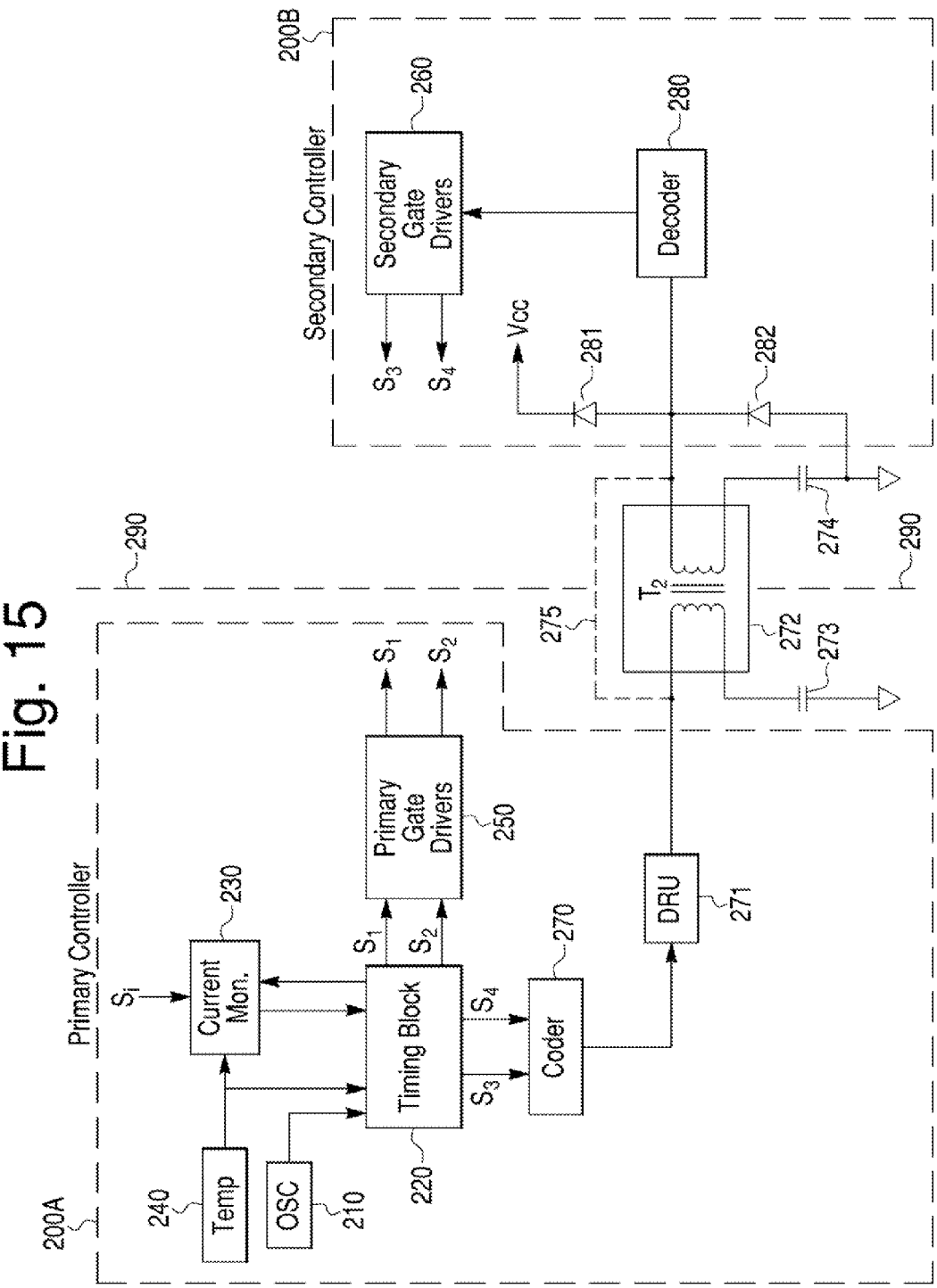

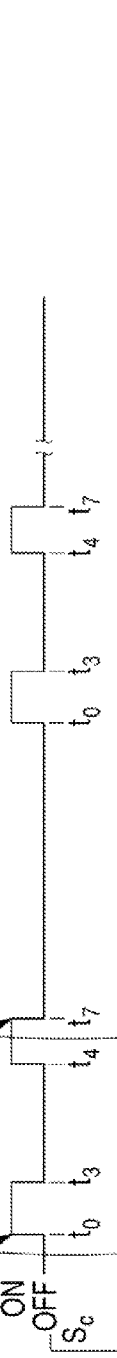
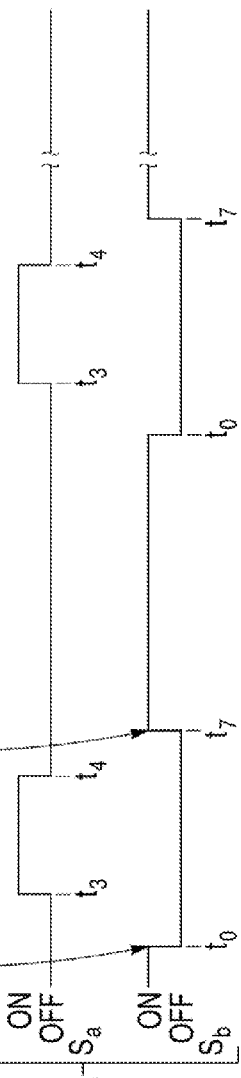
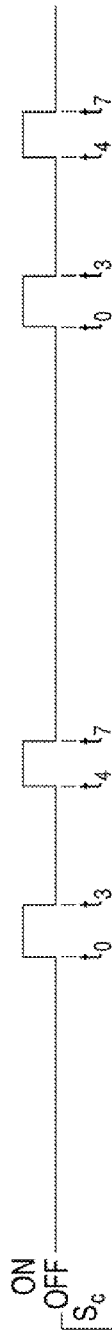
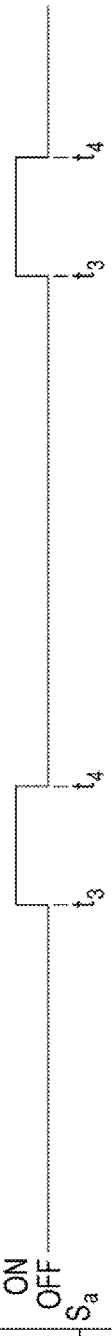
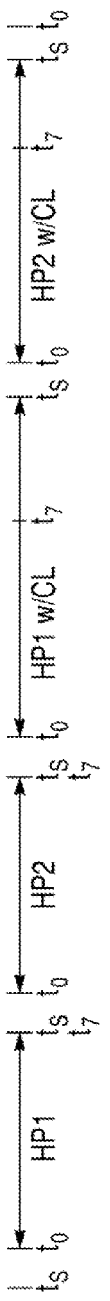
Fig. 16A
Fig. 16B
Fig. 16C
Fig. 16D
Fig. 16E
Fig. 16F
Fig. 16G
Fig. 16H

DIGITAL CONTROL OF RESONANT POWER CONVERTERS

TECHNICAL FIELD

This invention relates to apparatus and methods for digital control of resonant power converters, more particularly the invention relates to digital control of resonant zero-current and zero-voltage switching resonant power converters.

BACKGROUND

Certain types of power converters use resonant processes to efficiently transfer energy from an input source to a load. One example of such a power converter, called a Sine-Amplitude Converter ("SAC"), is described in detail in Factorized Power Architecture with Point of Load Sine Amplitude Converters, Vinciarelli, U.S. Pat. No. 6,984,965 (assigned to VLT, Inc. of Sunnyvale, Calif., the entire disclosure of which is incorporated herein by reference) (the "SAC Patent"). A block diagram of a half-bridge sine amplitude converter 10 is shown in FIG. 1. The SAC comprises SAC power conversion circuitry 100 (shown connected to power source 50 and load 60) and a SAC controller 20 which controls the turning ON and OFF of switches within the power conversion circuitry 100. A simplified and idealized summary of the operation of the sine amplitude converter 10 is as follows (a detailed description of operation may be found in the SAC Patent): switches S1 110 and S3 130 are closed when the voltages across switches S1 110 and S3 130, and the resonant portion of the primary current $I_{pri}$, are each substantially zero, initiating a power transfer interval. Closing switch S1 110 causes an essentially sinusoidal flow of resonant current $I_{pri}$ in the primary winding at a characteristic resonant frequency, $F_R$, and period, $T_R$, defined by a resonant circuit comprising a resonant inductance Ls 150 and a resonant capacitance $C_{res}$ 160. When the sinusoidal current flow completes a half-cycle, and the current $I_{pri}$ returns substantially to zero, switches S1 110 and S3 130 are opened. An energy recycling interval following the opening of switches S1 110 and S3 130, allows the transformer 80 magnetizing current to charge and discharge circuit parasitic capacitances such that the voltages across switches S2 120 and S4 140 decline toward zero. When the voltage across switches S2 120 and S4 140 are at their minimum, i.e. substantially zero (or at a relatively low value, dependent upon the magnitude of the magnetizing energy), they are turned ON to initiate another power transfer interval. Each converter operating cycle comprises two power transfer intervals of equal length and two energy recycling intervals of equal length; one half-cycle of the converter operating cycle comprises a single power transfer interval and an associated energy recycling interval. Each power transfer interval is substantially equal to one-half of the characteristic period, $T_R/2$; each operating cycle, of duration T, is therefore greater than or equal to $T_R$, depending on the length of the energy recycling interval. The converter operating frequency, $F_{op}$, is defined as the inverse of the length of the converter operating cycle: $F_{op}=1/T$. Typical SACs may have converter operating frequencies between 1 MHz and 4 MHZ, or higher.

Conventionally, control of a SAC requires that circuit conditions be monitored in order to determine the proper times at which to turn switches ON and OFF. As shown in FIG. 1, the SAC controller 20 may comprise End-of-Cycle Sense circuitry 30 to receive information from the SAC power conversion circuitry 100 to establish when switches should be turned ON and OFF. For example, the voltage across one or more of the switches may be monitored to establish the timing of a zero-voltage switching ("ZVS") or zero-current switching ("ZCS") event, or the current flowing in the transformer 80 may be monitored to establish the timing of a ZCS event. The monitoring circuitry may provide a feedback signal to the End-of-Cycle Sense circuitry 30 in the controller 20 which responds to the feedback signal by altering the states of one or more switches.

Contemporary high-frequency power converters typically use MOS-gated power switching devices, such as MOSFETs and IGBTs, which have an essentially capacitive gate control terminal. Efficiently recycling the energy during the turning ON and OFF of such a device may increase overall converter operating efficiency. One way to efficiently recycle the energy is to use a resonant technique. Apparatus and methods for resonant recycling of capacitive gate energy are described in: High Efficiency Floating Gate Driver Circuit Using Leaking Inductance Transformer, Vinciarelli, U.S. Pat. No. 6,107,860; Lossless Gate Driver Circuit for a High Frequency Converter, Steigerwald, U.S. Pat. No. 5,010,261; High Frequency Control of a Semiconductor Switch, Toile et al, U.S. Pat. No. 7,602,229; and Gate Driving Circuit, Inoshita, U.S. Pat. No. 7,091,753.

SUMMARY

In general, in one aspect, a method of synchronously operating a power converter in a series of converter operating cycles includes providing an oscillator for generating clock signals at an oscillator frequency and generating timing control signals for each of a plurality of events based upon the clock signals in a standard converter operating cycle having a standard operating period and frequency. The timing and control signals may turn a primary switch ON and OFF at times when essentially zero voltage is impressed across and essentially zero resonant current is flowing in the primary switch and turn a secondary switch ON and OFF at times when essentially zero current is flowing in and essentially zero voltage is impressed across the secondary switch. The oscillator frequency may be preset and the timing of the timing control signals for one or more selected events may be set independently of other timing control signals and events.

Implementations of the method may include one or more of the following features. A current monitor trigger synchronized with a predetermined time during the converter operating cycle, when a signal indicative of a current flowing in the converter may be sampled, may be generated. The current monitor trigger may be synchronized with a time at which a resonant current reaches a peak and a magnetizing current is essentially zero. The current monitor trigger may be synchronized with a time that follows the start of the ON time of the at least one primary switch by approximately one fourth of the characteristic resonant period of the power train.

Timing control signals may be generated based upon the clock signals in a modified converter operating cycle, having a modified operating period and frequency, to turn the primary switch ON at times when essentially zero voltage is impressed across and essentially zero resonant current is flowing in the primary switch and to turn the primary switch OFF at selected times before a resonant current flowing in the primary switch returns to zero. The selected times may be based upon when a current flowing in the selected switch is expected to meet or exceed a predetermined threshold, e.g. for current limiting. The selected times may be based upon when a current flowing in the selected switch is expected to fall below a predetermined threshold, e.g. for no-load or light-load operation. The modified operating frequency may be greater than the standard operating frequency. Timing control signals may be generated based upon the clock signals to turn selected switches in the converter ON to form a clamp phase during which at least one winding of the transformer is shunted by a low resistance circuit to essentially losslessly trap energy in the transformer. The modified operating frequency may be essentially equal to the standard operating frequency. The duration of the clamp phase may be adjusted based upon the magnitude of a current flowing in the converter. The duration of the clamp phase may be increased as the magnitude of the current flowing in the converter increases, e.g. to increase the output resistance of the converter such as for in-rush current limiting. The duration of the clamp phase may be decreased as the magnitude of the current flowing in the converter decreases, e.g. for reducing power dissipation for operation with a reduced load.

A gate drive circuit may be provided for operating selected switches in the converter and generating timing control signals based upon the clock signals to (a) initiate a transition of the selected switches from ON to OFF or OFF to ON, (b) hold the selected switches ON, and (c) hold the selected switches OFF. The level of the control signal for the primary switch may be adjusted to increase the effective resistance of the converter in a modified converter operating cycle, e.g. to maintain a desired current level in the converter or to maintain a desired power dissipation in the primary switch. The gate drive circuit may include a resonant circuit including the gate capacitance and having a characteristic resonant gate drive period that is at least five times less that the characteristic resonant period of the power train.

An encoder may be adapted to receive selected timing control signals for turning the secondary switch ON and OFF and generate an interface signal comprising a synchronization signal for indicating the start of a half period, and timing features to signal (a) the start of a transition of the secondary switch from OFF to ON, (b) the start of holding the secondary switch ON, and (c) the start of holding the secondary switch OFF. The interface signal may include a polarity signal to indicate an identity of the half period. A secondary side control circuit may be adapted to receive the interface signal and generate timing control signals including (a) the start of a transition of the secondary switch from OFF to ON or ON to OFF, (b) the start of holding the at least one secondary switch ON, and (c) the start of holding the at least one secondary switch OFF; for operating the secondary switch. The secondary side control circuit may derive power for operation from the interface signal. The secondary side control circuit may be adapted to measure aspects of the interface signal to generate timing control signals not encoded in the interface signal.

The timing control signals may be generated by counting the clock signals from the oscillator, setting a count threshold for each event, and generating the respective timing control signal for each event as the counting matches the respective count threshold. The oscillator and timing events may be open-loop with respect to the power train, may be adjusted with feedback from measurements in the power train, e.g. as a calibration step during manufacturing or as part of a closed-loop feedback system during operation.

DESCRIPTION OF DRAWINGS

FIG. 15 shows a block diagram of a digital controller comprising a primary-side and a secondary-side controller.
FIG. 16A through FIG. 16H show waveforms for the controllers of FIG. 15.

Like reference designations in the various drawings indicate like elements.

DETAILED DESCRIPTION

Figure 1:
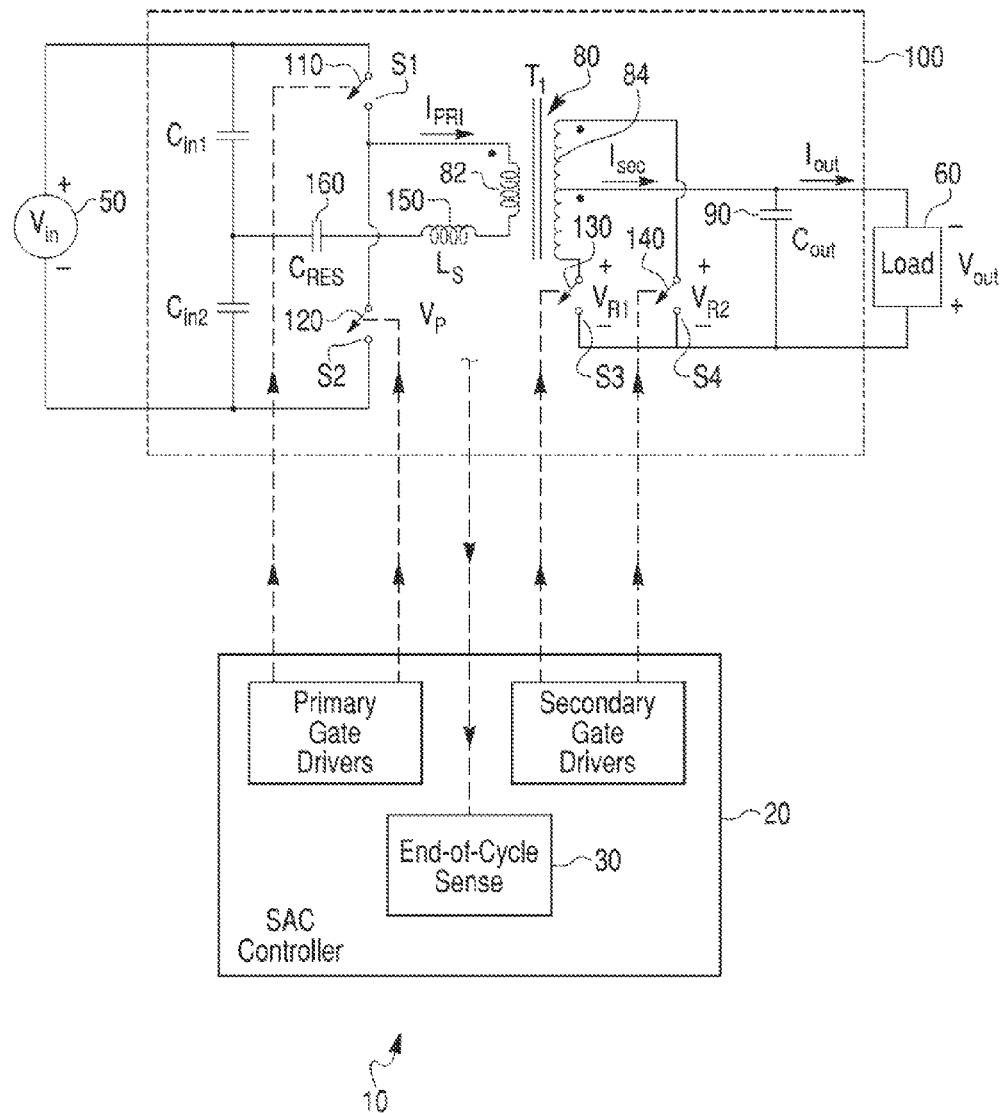
FIG. 1 shows a block diagram of a prior-art SAC converter.
Figure 2:
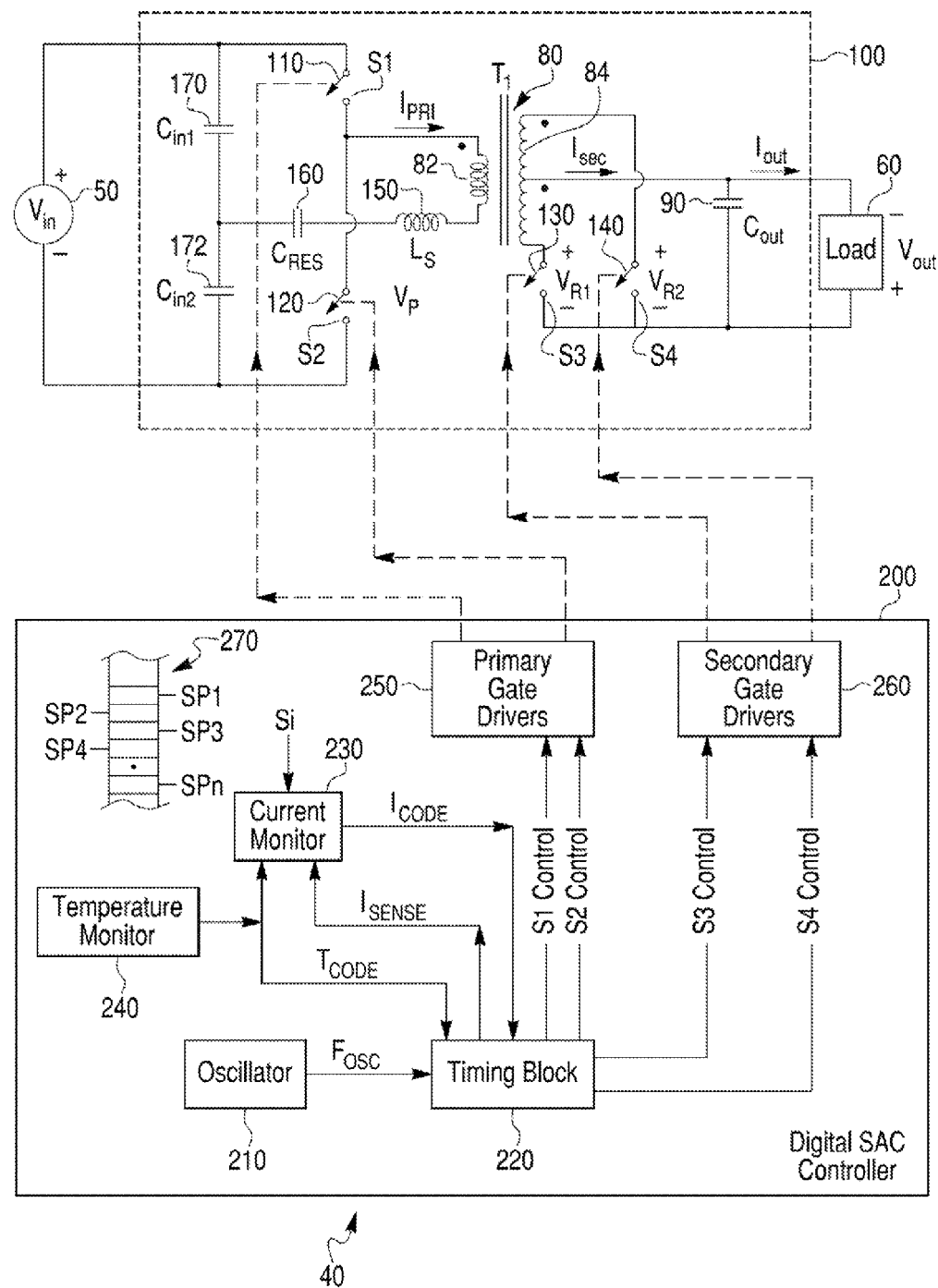
FIG. 2 shows a block diagram of a SAC converter comprising a digital controller.

In FIG. 2, a SAC converter 40 is shown including SAC power conversion circuitry 100 and a Digital SAC Controller 200. The SAC power conversion circuitry 100 shown in FIG. 2 is essentially the same as shown in FIG. 1 and includes a transformer 80, a half-bridge primary circuitry connected to receive power from the input source 50 and drive the primary winding 82. The primary circuit as shown includes switches S1 110 and S2 120 and bridge storage capacitors 170, 172. The resonant inductance Ls 150 and resonant capacitance $C_{res}$ 160 define a characteristic resonant frequency, $F_R$, and period, $T_R$, for the transfer of energy between the input source 50 and the load 60:

$$T_R = 1/F_R = 2\pi\sqrt{(Ls + Cres)} \quad (1)$$

The secondary circuitry is connected between secondary winding 84 and load 60 and includes switches S3 130 and S4 140 and output storage capacitor 90.

I. Digital Timer Controller

The Digital SAC Controller ("DSC") 200 as shown in FIG. 2 includes an oscillator 210 for generating a series of timing pulses at a frequency, $F_{OSC}$; a timing block 220 for generating one or more control signals or event outputs; and current monitoring circuitry 230. The DSC 200 may, as shown in FIG. 2, also include temperature monitoring circuitry 240, primary gate drivers 250, secondary gate drivers 260, and storage memory 270 for storing set-point values and other parameters. Alternatively, the primary gate drivers 250 or secondary gate drivers 260, or both may be external to the digital SAC controller 200.

Figure 4:
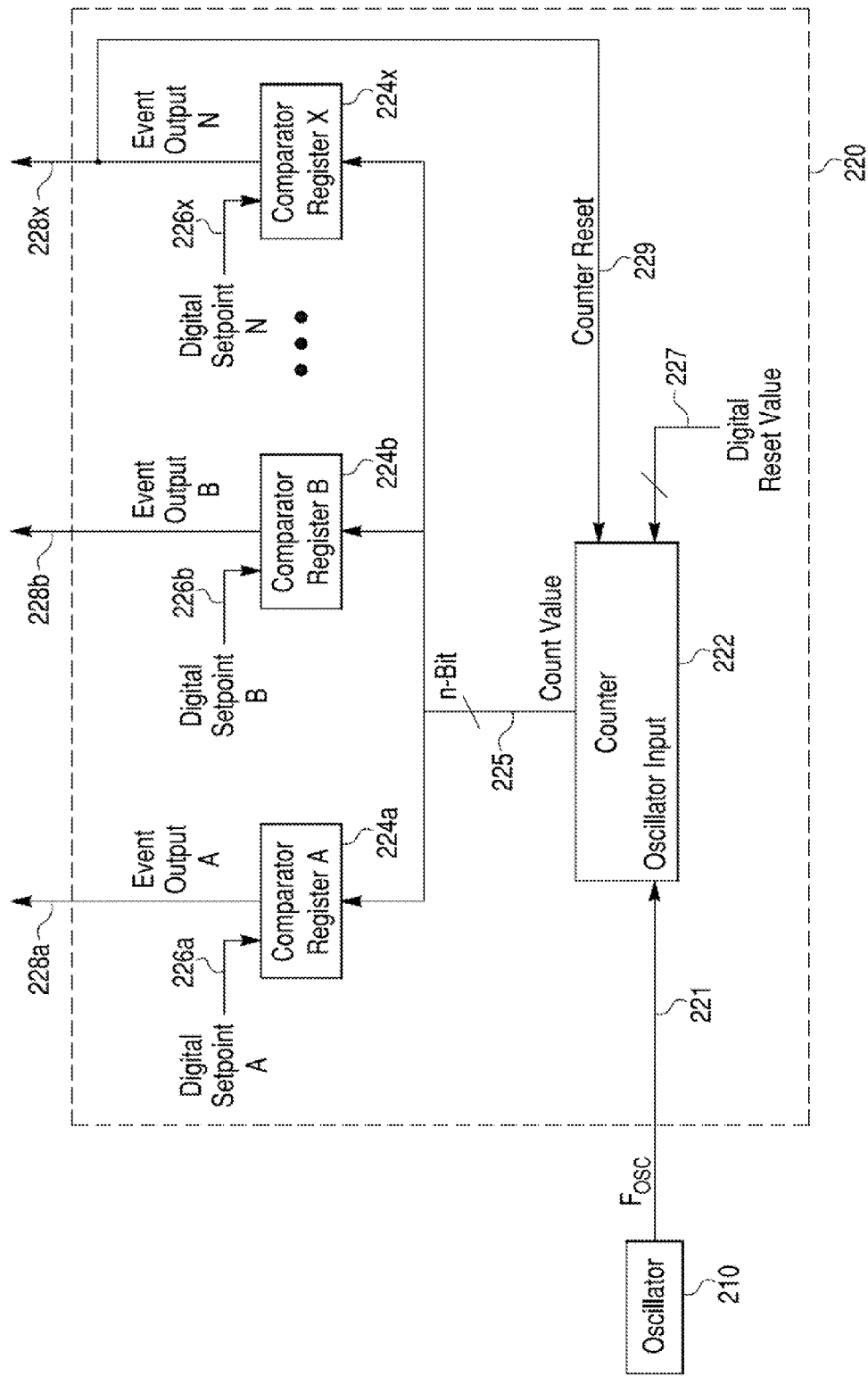
FIG. 4 shows a timing block architecture for use in a digital controller.

The beginning and end of a converter operating cycle, the beginning and end of each power transfer interval, and the points during each operating cycle at which switches are turned ON and OFF may be controlled by the DSC 200 based upon pre-defined timing parameters. The pre-defined timing parameters may be pre-programmed into the DSC as circuitry logic or stored as parameters for example in storage memory 270. FIG. 4 shows a block diagram of the timing block 220 in greater detail. The oscillator 210, as shown in FIG. 4, delivers a series of clock pulses at a frequency, $F_{OSC}$, to the timing block 220. Architecturally, the timing block may comprise a counter 222 that increments (or decrements) in response to each clock pulse received at its oscillator input 221. (The clock frequency, $F_{OSC}$, may be made much greater than the characteristic resonant frequency, $F_R$, of the converter to provide adequate resolution for the various timing events.)

An n-bit count value corresponding to the contents of the counter 222 may be delivered from the counter to one or more digital comparator registers, e.g. comparator registers 224a, 224b, through 224x (where the suffix x signifies the last in the series of comparator registers having an integer number greater than 1) as shown in FIG. 4. The number, n, of counter bits will be determined by the timing resolution and the total duration of the converter operating period (or half-period). Each comparator register may receive a digital set-point value, e.g. set-point values 226a, 226b through 226x as shown in FIG. 4 or be otherwise programmed to respond to a particular count value or range of values, for example, by comparing the count value from the counter 222 to its respective set-point value and generating a respective event output, e.g. event outputs 228a, 228b . . . 228x in FIG. 4, when the two values satisfy a predetermined condition, such as the count value is less than, greater than, or is equal to, the set-point value. As shown in FIG. 4, the output of one of the comparator registers (e.g., register 224X) may be used as an end of cycle signal, which may be connected to a reset input 229 of counter 222, resetting the counter to a pre-determined digital reset value 227 (e.g. zero) in response to the clock pulse following receipt of the counter reset signal.

By this process, the counter increments (or decrements) between two pre-defined count limits, the reset value 227 and the set-point value of the end of cycle comparator, during a continuous series of counter cycles. The length of each counter cycle depends on the difference between the pre-defined count limits and the oscillator period. During each counter cycle, event outputs are generated as the counter contents (counter value) matches a predetermined digital set-point. Each event may be set independently of the other events and the timing signals for controlling various aspects of the converter may also be set independently of the other timing signals and events. As many or as few event outputs as are necessary may be generated in the manner shown. It being understood that the block diagram of FIG. 4 is illustrative of one way to implement the functions of the timing block 220 which may be implemented using various other logic functions or controllers.

Figure 3A:
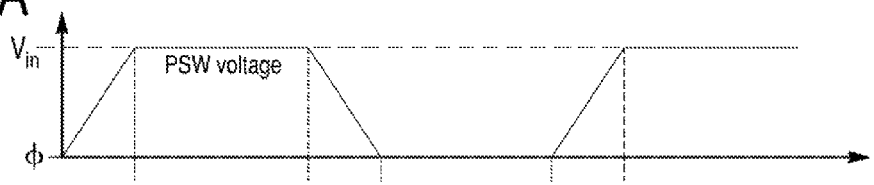
FIG. 3A through FIG. 3G show waveforms for the converter of FIG. 2.
Figure 3B:
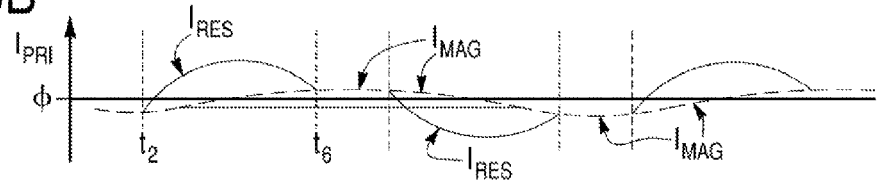
Figure 3C:
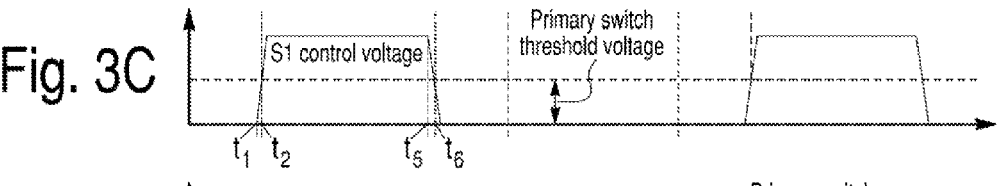
Figure 3D:
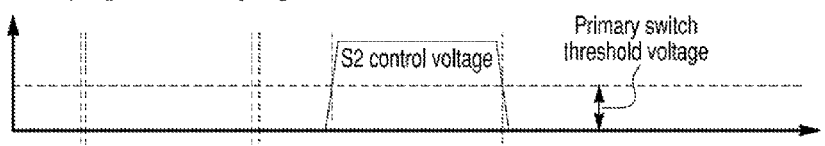
Figure 3E:
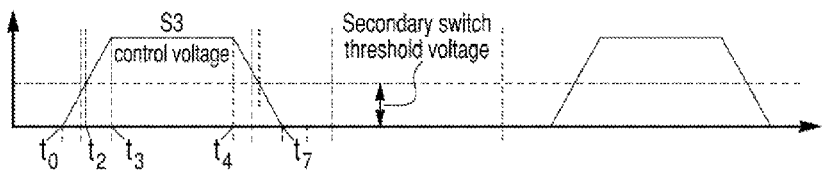
Figure 3F:
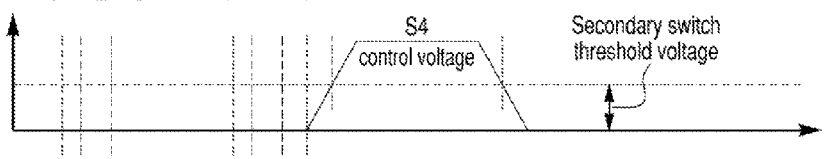
Figure 3G:
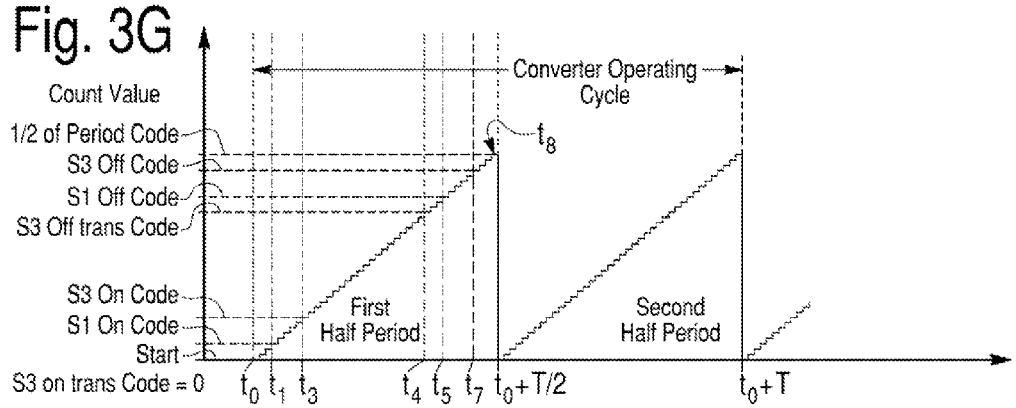

Referring to FIGS. 3A through 3G, operating waveforms are shown for a converter 40 of the kind illustrated in FIG. 2 using MOSFET devices for switches S1 110, S2 120, S3 130, S4 140 and a timing block 220 of the kind illustrated in FIG. 4. The waveforms are drawn to illustrate specific features under discussion and therefore may not be to scale in either the vertical or horizontal axes. FIG. 3G shows the count value output 225 of the counter 222 (FIG. 4) as a staircase starting at zero, which is in this example the digital reset value (227 FIG. 4) and increasing with time, indicating that the counter value increments with each successive clock pulse received from the oscillator 210.

A first half-cycle of the converter operating cycle may be initiated with the counter reset to its reset value of zero as shown at time t0 in FIG. 3G. At time t0, a first comparator register (FIG. 4) generates an event output (S3 On Trans Code=0: FIG. 3G) that initiates the turning ON of switch S3 130 (see, S3 Control voltage: FIG. 3E) by activating a secondary gate driver 260 (FIG. 2) connected to a respective MOSFET gate. A first digital set-point for the first comparator register (FIG. 4) may be pre-determined based upon the known characteristics of the particular MOSFET device that is selected for switch S3 130. As shown by the switch S1 110 control voltage in FIG. 3C, a second comparator register (FIG. 4) generates an event output (S1 On Code: FIG. 3G) that initiates the turning ON of switch S1 110 at time t1 by activating a primary gate driver 250 (FIG. 2) connected to a respective MOSFET gate. A second digital set-point for the second comparator register may be pre-determined based upon the known characteristics of the particular MOSFET device that is selected for switch S1 110. The pre-determined first and second digital set-points may be selected so that the gate voltages of switches S1 110 and S3 130 rise above their respective gate threshold voltages, and become conductive, at essentially the same time, t2 (FIGS. 3C and 3E). Because, at time t2, the voltage Vp (FIG. 2) is essentially equal to the input voltage, Vin, the voltage across switch S1 110 is essentially zero and switches S1 110 and S3 130 turn on at essentially zero voltage. With switches S1 110 and S3 130 ON (time t2), a power transfer interval ("PTI") is initiated and a resonant current, at the characteristic frequency $F_R$, flows in the primary winding 82 and the secondary winding 84. FIG. 3B shows the primary winding current, comprising both the resonant current (solid line) and the primary magnetizing current (dashed line). It may be desirable, e.g. in certain gate drive circuits (one of which is described below), to generate an event output indicating that a MOSFET gate has been fully charged, for example, S3 On code (FIG. 3G) at time t3 corresponding to the switch S3 130 control voltage (FIG. 3E) reaching a fully charged state may be generated by a third digital comparator (FIG. 4).

As shown at time t4, a fourth comparator register (FIG. 4) generates an event output (S3 Off Trans Code: FIG. 3G) that initiates the turning OFF of switch S3 130, by de-activating a secondary gate driver 260 (FIG. 2) connected to the respective MOSFET gate (see S3 control voltage in FIG. 3E). A fourth digital set-point for the fourth comparator register may be pre-determined based upon the characteristics of the particular MOSFET device that is selected for use as switch S3 130. As shown at time t5, a fifth comparator register (FIG. 4) generates an event output (S1 Off code: FIG. 3G) that initiates the turning OFF of switch S1 110, by de-activating a primary gate driver 250 (FIG. 2) connected to the respective MOSFET gate (see S3 control voltage in FIG. 3C). A fifth digital set-point for the fifth comparator register may be pre-determined based upon the characteristics of the particular MOSFET device that is selected for use as switch S1 110. The pre-determined fourth and fifth digital set-points may be selected so that the gate voltages of switches S1 110 and S3 130 fall below their respective gate threshold voltages, and become non-conductive, at essentially the same time, as shown in the example at time t6 in FIGS. 3C and 3E. Preferably, the time at which the switches become non-conductive (time t6 in FIGS. 3C, 3E) is selected to correspond to one-half of the characteristic period of the converter, $T_R/2$, at which time the resonant portion of the primary current will return to zero (FIG. 3B). (The duration of each PTI, e.g. time t2 to time t6 in FIG. 3B during normal converter operation, $T_{PTI\text{-}OP}$, is essentially equal to one half of the resonant period: $T_{PTI\text{-}OP}=T_R/2$.) Similar to the fully-charged-gate event mentioned above, it may be also desirable in certain gate drive circuits, to generate an event output indicating that a MOSFET gate has been fully discharged. As shown in the example, the S3 Off code (FIG. 3G) may be generated at time t7 corresponding to the switch S3 130 control voltage (FIG. 3E) reaching a fully discharged state, e.g. by another digital comparator (FIG. 4), the sixth digital comparator in this example.

With the switches OFF, an energy recycling interval following time t6 may begin during which the magnetizing current (dashed line, FIG. 3B) flowing in the primary winding 82 of the transformer 80 (FIG. 2) charges and discharges capacitances at the node between switches S1 110 and S2 120 causing the voltage, Vp, across switch S2 120 to decline, and in ideal cases to reach zero, in preparation for ZVS turn ON of switch S2 120 during the next converter half cycle. Another digital comparator (the seventh comparator in the example) detects when the counter reaches a value equal to the half-of-period code, which is preferably chosen to coincide with the time that voltage, Vp, reaches its minimum. As shown in the example of FIG. 3G at time t8, the seventh comparator generates the ½-of-period code which may be used to reset the counter to the reset value (zero in the example) on the next clock cycle, thereby initiating the next converter half-cycle.

The second half-cycle differs from the first half-cycle in the switches being controlled: switches S2 120 and S4 140 are controlled during the second half-cycle instead of switches S1 110 and S3 130 in the first half-cycle. A de-multiplexer may be used to route the signals to the appropriate switches for the alternating half cycles. The first half-cycle ends at t0+T/2, where T is the length of an operating cycle; the second half-cycle completes an operating cycle at time T. Thereafter, the converter operates with a continuing sequence of first and second half-cycles.

By using pre-determined set-points for initiating switching and other events during an operating cycle, the need for feedback circuits, such as those required to establish the end of a power transfer interval or ZVS period are eliminated, thereby simplifying circuit design. Furthermore, using pre-determined set-points may improve efficiency through anticipation of event timing. For example, with reference to FIGS. 3E and 3C, activation of the switch S3 130 gate driver at time t0, prior to the activation of the switch S2 120 gate driver at time t1, may be used to compensate for the differences in component and circuit parameters so that the gate voltages of switches S1 110 and S3 130 rise above their respective gate threshold voltages, and become conductive, at essentially the same time, t2.

Use of pre-determined set-points may require that circuit tolerances, or specific circuit values, be taken into account or established. However, unit-to-unit reproducibility of certain parameters, or parametric dependencies, may relieve requirements for precision: e.g., the length of an power transfer interval in a sine amplitude converter may be set to $$T_R/2 = \pi\sqrt{(Ls + Cres)},$$

where Ls 150 and $C_{res}$ 160 are nominal values for a particular design. Because of the square root dependency, a variation in Ls or $C_{res}$ as large as 5% may not result in an error in timing of the power transfer interval of more than 2.5%. Timing of ZVS intervals may also be non-critical, as capacitive energy storage is a function of the square of the voltage—reducing the voltage to within 10% of zero may reduce stored energy by more than 99%. Methods for calibration and adjustment of timing may comprise: adjustment of the oscillator 210 frequency (e.g., in some embodiments the oscillator 210 may comprise a precision low frequency oscillator driving a phase-locked-loop for generating the relatively high frequency $F_{OSC}$, and a counter in the phase-locked-loop may be adjusted to calibrate $F_{OSC}$); and/or adjustment of the start and end counts of each digital comparator register. Pre-determined timing count values may be established based upon published component or circuit data and specifications and/or they may be set on a unit-by-unit basis using measurements made during a manufacturing process. Furthermore, a closed-loop feedback path may be provided to adjust the oscillator frequency or adjust the count of selected events based upon circuit conditions during operation to reduce any timing errors.

II. Current Monitor

Figure 5:
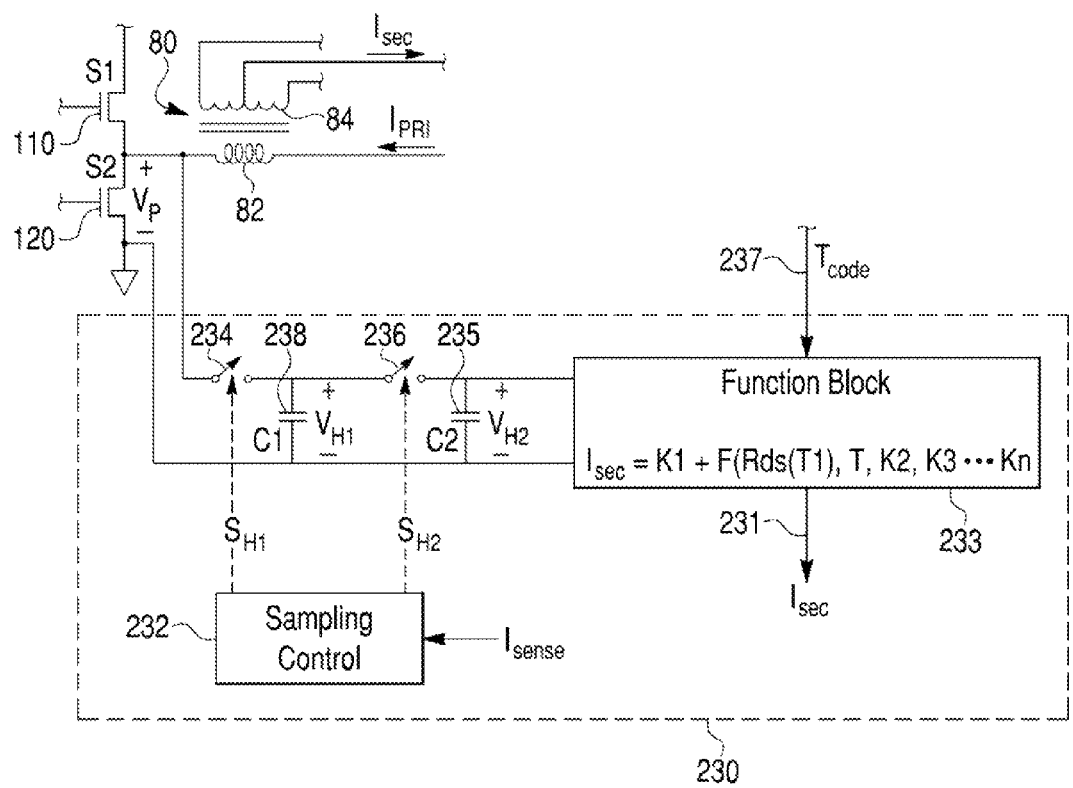
FIG. 5 shows a current monitor block.
Figure 6A:
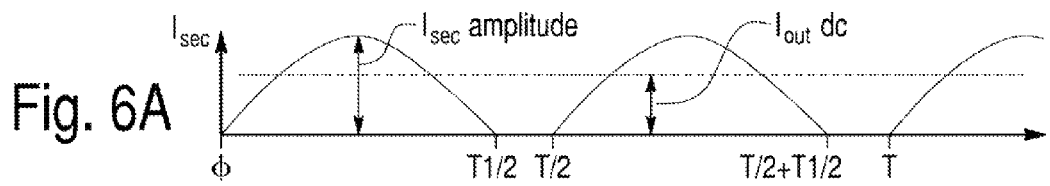
FIG. 6A through FIG. 6G show waveforms for the current monitor block of FIG. 5.
Figure 6B:
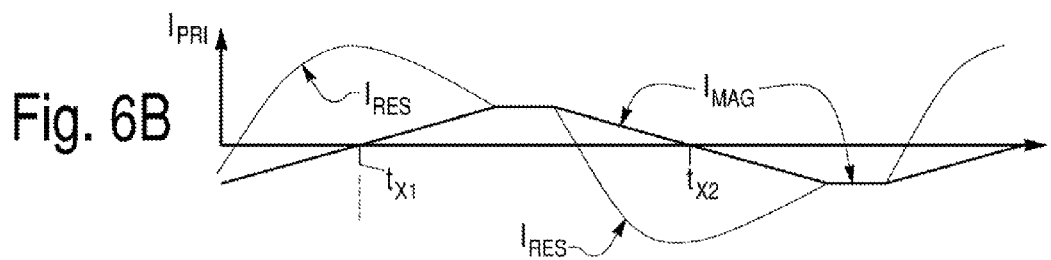
Figure 6C:
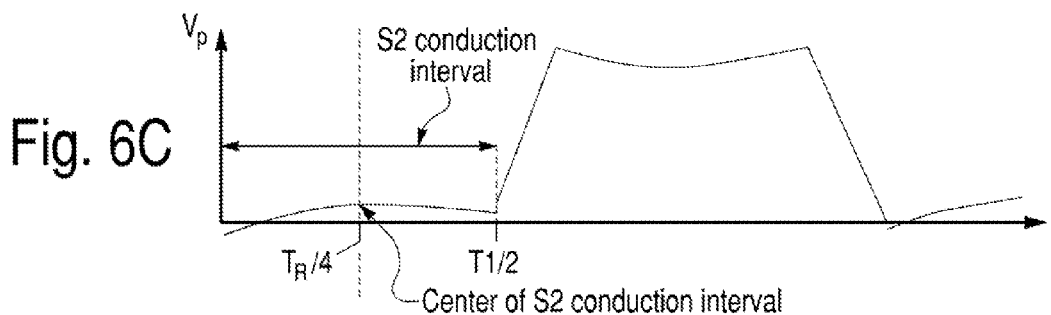
Figure 6D:
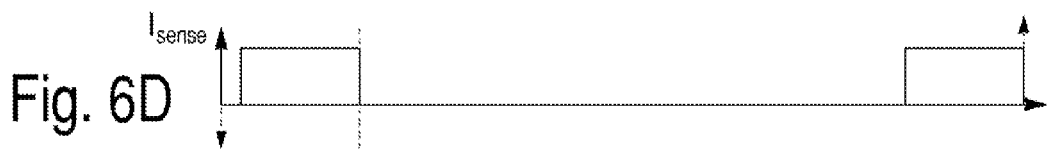
Figure 6E:
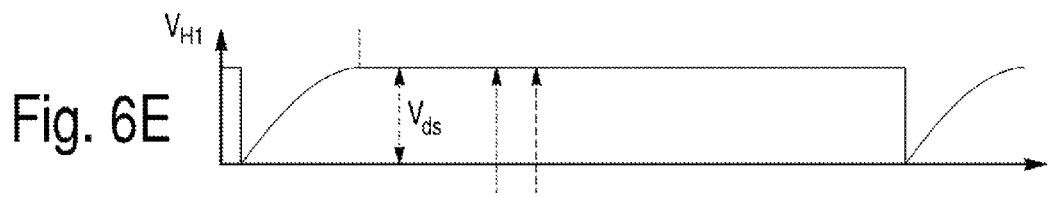
Figure 6F:
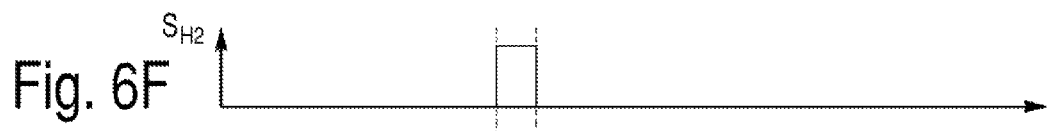
Figure 6G:
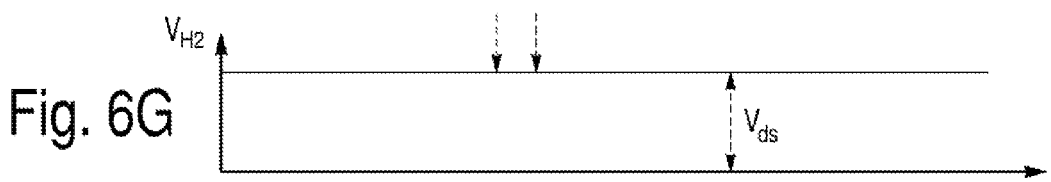

Referring to FIG. 5, a block diagram of a current monitor circuit 230 that may be used in the current monitor block 230 of the controller 200 of FIG. 2 is shown. The current monitor circuit 230 accurately infers the output current, $I_{out}$, or secondary current, $I_{sec}$, using a measurement of primary current, $I_{pri}$, thereby eliminating the need to make measurements across a primary-secondary isolation barrier. The current monitor circuit 230 may be used by the SAC controller 200 to limit inrush current during startup operation of the converter, or to perform current limiting during normal converter operation, e.g. in the event of an overload or short circuit.

Waveforms for the current monitor 230 of FIG. 5, during normal converter operation—which may be defined by power transfer intervals being one half of the characteristic resonant period ($T_R/2$) in duration—are shown in FIGS. 6A through 6D. The current in the secondary winding, $I_{sec}$, and the current in the primary winding, $I_{pri}$ are respectively illustrated in FIGS. 6A and 6B. As noted earlier, the primary winding current comprises both a resonant component, $I_{res}$, that is essentially equal to the secondary current $I_{sec}$ multiplied by the secondary-to-primary turns ratio, N, of the transformer 80, and a magnetizing current component, $I_{mag}$:

$$I_{pri} = I_{mag} + N*I_{sec}. \quad (2)$$

Therefore, at times when the magnetizing current, $I_{mag}$, crosses through zero (e.g., at times tx1, tx2, FIG. 6B) the primary current, $I_{pri}$, is directly proportional to the secondary current, $I_{sec}$: $I_{pri} = N*I_{sec} @ T_{Imag=0}$. For the converter shown, the magnetizing current crosses through zero at the midpoint of each power transfer interval (e.g., at time $T_R/4$, FIG. 6C). When a MOSFET device is used for switch S2 120 (FIG. 5), the voltage across switch S2 120 is proportional to the primary current:

$$Vp(t) = I_{pri}(t)*R_{DS-ON}(T); \quad (3)$$

where $R_{DS-ON}(T)$ is the ON resistance of the FET at its operating point, e.g. operating temperature T and gate bias, $V_{GS}$.

The timing block 220 of FIGS. 2 and 4 may be used to generate a signal at the midpoint of each power transfer interval, e.g., in FIG. 6 at time tx=$T_R/4$, for example using the digital comparator techniques described above in connection with FIG. 4. Similarly, the timing block 220 may also generate a control signal, Isense (FIGS. 2, 6D), for use by the current monitor block 230, that begins when switch S2 120 turns ON and ends at the midpoint of the power transfer interval. In operation, the Isense control signal may be used by the sampling control block 232 to turn the first sampling switch 234 ON and OFF (SH1: FIG. 5). When ON the first sampling switch 234 causes the voltage, $V_{H1}$, across the first sampling capacitor 238 (FIG. 6E) to follow the voltage, Vp(t), across switch S2 120. At time tx=$T_R/4$ (with $I_{mag}$ crossing zero), the first sampling switch 234 may be turned OFF to hold the voltage, $V_{H1}$, corresponding to the voltage, Vp, at the time, $T_{Imag=0}$, when $I_{mag}=0$. After the first sampling switch 234 is turned OFF, the sampling controller 232 may generate a second sampling pulse, SH2 (FIG. 6F), causing the second sampling switch 236 to momentarily close and then open, transferring the voltage from the first sampling capacitor 238 to the second sampling capacitor 235. With switch 236 closed, the voltage, $V_{H2}$ (FIG. 6G) across the second sampling capacitor 235 will be proportional to the voltage $V_{H1}$ across the first sampling capacitor 238 and with switch 236 opened, the second sampling capacitor 235 will hold the voltage $V_{H2}$ until the next sampling period. The two stage sample and hold circuit provides a voltage, $V_{H2}$, that is maintained constant at a level that is proportional to the peak value of $I_{res}$ during the power transfer interval and while the first sample and hold acquires the next sample.

Because the sampled voltage $V_{H2}$ is measured across a MOSFET resistance, the calculation of secondary current may need to account for the temperature dependence of the MOSFET resistance. In general the on resistance of the MOSFET, $R_{DS-ON(Tx)}$, at temperature $T_x$, may be related to the ON resistance of the MOSFET, $R_{DS-ON(TF)}$, at a fixed temperature, $T_F$:

$$R_{DS-ON(Tx)} = f(R_{DS-ON(TF)}, T_x, K2, K3 \ldots Kn) \quad (4)$$

where K2, K3 . . . Kn are constants specific to the MOSFET being used. The secondary current may then be calculated as:

$$I_{sec} = K1 * V_{H2}/R_{DS-ON(Tx)} = K1 * V_{H2}/f(R_{DS-ON(TF)}, T_x, K2, K3 \ldots Kn) \quad (5)$$

where K1 is a constant that accounts for, e.g., the transformer turns ratio and the relative values of the sampling capacitors 238, 235. Because the average converter output current, $I_{out}$, is equal to the average value of the rectified secondary current, measurement of $I_{out}$ requires only that the constant K1 be modified. Function Block 233 (FIG. 5) may be used to perform calculation of $I_{sec}$, $I_{out}$, or both.

Although the current monitor has been described when used with a MOSFET as a current sensing element, alternative embodiments are possible. For example a resistor in series with the resonant circuit, or a combination of a resistor in series with a MOSFET, may be used for sensing the current.

III. Current Limiting

In the absence of inrush current limiting, turning on a converter having a capacitive load could result in very large resonant currents flowing at the input of the converter at least until the output capacitance is charged to a sufficiently high voltage. The digital controller 200 may provide inrush current limiting and current limiting during normal operation using the current monitor 230 to sense the current.

A. Truncated Power Transfer Intervals

One possible way to limit the inrush current is to operate the SAC power train with truncated power transfer intervals, i.e. the duration of the power transfer intervals is reduced to less than the characteristic resonant half period ($T_{PTI} < \frac{1}{2} T_{Res}$). With PTIs shorter than the resonant half period, $T_{PTI} < \frac{1}{2} T_{Res}$, the converter's series resonant circuit will exhibit an essentially inductive impedance (inductance Ls 150, FIG. 2), thereby limiting the current that flows into the converter. The truncated PTIs may be used in converter operating cycles that include two shortened PTIs and two intervening energy recycling intervals (which will be somewhat longer as a result of the reduced magnetizing current in the transformer) resulting in an elevated operating frequency, $F_{hi}$, which is greater than the characteristic frequency, $F_R$. Alternatively, the truncated PTIs may be used in converter operating cycles that include one or two clamp phases (discussed in detail below) in addition to intervening energy recycling intervals to control the operating frequency to be greater than, equal to, or less than the characteristic frequency, $F_R$.

A method for controlling inrush current in a resonant converter, such as a SAC, that exhibits an inductive input impedance with truncated power transfer intervals or at frequencies above a normal operating frequency, $F_{op}$, may be implemented in a controller such as the digital controller 200 and may include the following steps:

A. The controller may initially use an operating period, $T_n$, or a power transfer interval that is shorter than the normal operating period or power transfer interval (i.e., at an operating frequency, $F_n$, that is higher than the normal operating frequency, $F_{op}$) during start-up operation.

B. Operation of the converter may continue at the present operating interval, e.g. $T_n$, or PTI, as long as the peak current, e.g. the primary current, which may be sensed by the controller, e.g. using the current monitor 230, exceeds a pre-defined inrush threshold, $I_{Th}$.

C. When the controller detects that the current has declined below the threshold, $I_{Th}$, it may increase the operating period (or PTI) incrementally by $\Delta T$ to a longer operating period, $T_{n+1} = T_n + \Delta T$.

D. Operation may continue in the above manner, repeating processes B and C, incrementally increasing the period as the peak current falls until the period has been increased to the normal operating period, $T_{op}$, (or normal PTI) of the converter.

Figure 7A:
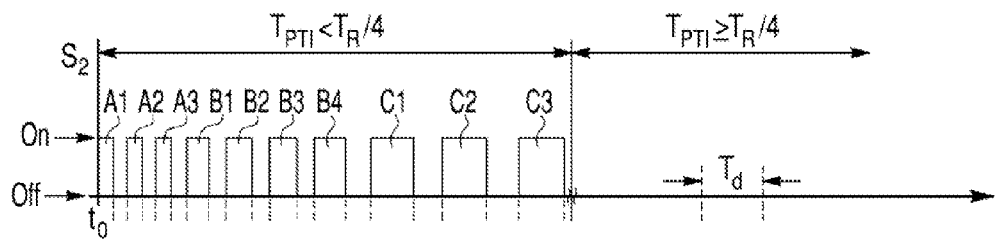
FIG. 7A through FIG. 7H show waveforms for a sine amplitude converter operating in accordance with an inrush current limiting method.
Figure 7B:
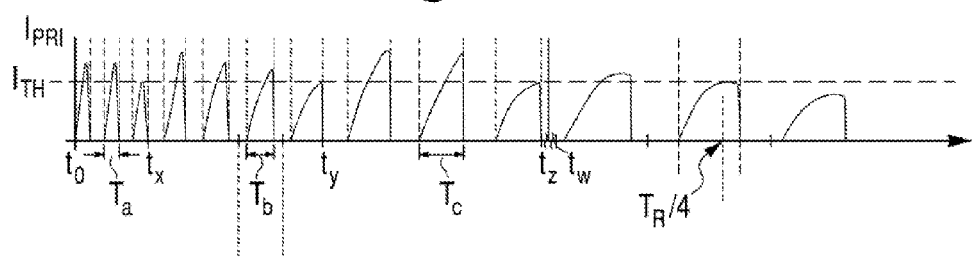

Application of the truncated PTI (without clamp phases, high frequency) inrush current limiting method in a SAC converter is illustrated in FIGS. 7A through 7H which assume that the output storage capacitor 90 (FIG. 2) is discharged and power is applied to the converter at time t0 (FIGS. 7A, 7B). For clarity and ease of illustration of the truncated PTI operation, FIGS. 7A and 7B do not show energy recycling intervals or clamp phases (discussed below). FIG. 7A shows the ON times for switch S2 120, which are representative of the conductive half of the converter operating period, i.e. one of the two power transfer intervals in each converter operating cycle. Although not shown in FIGS. 7A-7H, the converter operating cycles in high frequency operation may include energy recycling intervals during which the magnetizing energy may be used as described above to charge and discharge parasitic capacitances to reduce switching losses. The initial duration of the power transfer intervals, e.g. the ON time of switches S1 110 or S2 120, may be set to a fraction, e.g. $\frac{1}{6}^{th}$ of their normal duration ($T_{PTI-OP} = T_R/2$ during normal operation) for current limiting operation. For example, the initial PTI duration, $T_{TPI} = T_a$, shown in FIG. 7A is substantially shorter than half, $T_R/2$, of the resonant period. In a SAC whose resonant frequency is 1 MHz, resonant period is 1 uS, and each power transfer interval has a duration $T_{PTI-OP} = 0.5$ uS, the initial ON time, $T_{PTI-N}$, may for example be set to be $\frac{1}{6}$ of the normal operating half-period ($T_{PTI-N} = T_{PTI-OP}/6 = 83$ nS).

Figure 7C:
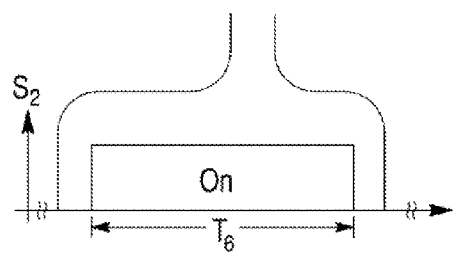

As shown in FIG. 7B, during the first PTIs (A1, A2 in FIG. 7A) having a duration $T_{TPI} = T_a$, the peak value of the primary current, $I_{pri}$ (FIG. 7B) increases above a pre-defined threshold, $I_{Th}$. The peak value of the current may be sensed by the current monitor 230 (FIG. 5) during power transfer intervals having a duration less than one quarter of the resonant period ($T_{PTI} < T_R/4$) by ending the sample and hold period either when switch S2 120 turns OFF (FIG. 7D) or a fixed time ($T_R/4$) after switch S2 120 is turned ON (FIG. 7G), whichever occurs first. For example, as shown in FIG. 7C, the timing block 220 may send an Isense signal to the current monitor circuit when switch S2 120 turns ON and capture a sample of the current when switch S2 120 turns OFF by turning the Isense signal OFF and briefly asserting SH2 to capture the sample. The calculated value of the peak current (from function block 233) may be compared to the threshold value, $I_{Th}$, to determine the length of the next half-period in accordance with the method.

The peak value of the primary current will eventually decline as energy is transferred to, and the voltage across the output capacitor rises, until, as shown in FIG. 7B the peak primary current remains below the threshold, $I_{Th}$, in the power transfer interval ending at time, tx. In response to the sensed peak current remaining below the threshold, $I_{Th}$, during a half-period, the controller may increase the duration, $T_{TPI}$, of the power transfer interval as described above. The duration, $T_{TPI}$, of the PTIs (B1, B2, B3, B4: FIG. 7A) immediately following PTI (A3 ending at time tx) in which the current remains below the threshold, is shown longer than the duration, $T_a$, of those PTIs (A1, A2, A3: FIG. 7A) preceding it in FIG. 7B: $T_b=T_a+\Delta T$, where $T_b$ is the duration of the PTIs following tx. For the converter operating parameters cited earlier, the value of $\Delta T$ may be 5 nS, making $T_b$=88 nanoseconds. Because of the incrementally longer power transfer interval ($T_b$), the peak current, $I_{pri}$, may again exceed the threshold, $I_{Th}$, for one or more operating cycles following the increase shown after time tx. The controller may continue to operate the converter continues with PTIs (B1, B2, B3, B4: FIG. 7A) having a duration of $T_b$ until time the peak current once again declines below the threshold, $I_{Th}$, as shown in FIG. 7B in PTI B4 ending at time, ty. Thereafter, the PTI duration may again incremented to the next larger value, e.g. $T_c=T_b+\Delta T$ as shown for PTIs C1, C2, and C3 in FIG. 7B, and the process may continue until the peak current once again remains below the threshold, $I_{Th}$, in PTI C3 ending at time tz. The process may continue in this manner until the duration of the PTIs has reached the normal PTI duration, i.e. until $T_{TPI-N+1}=T_{PTI-OP}=T_R/2$.

Figure 7F:
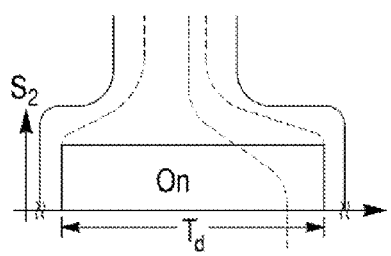
Figure 7D:
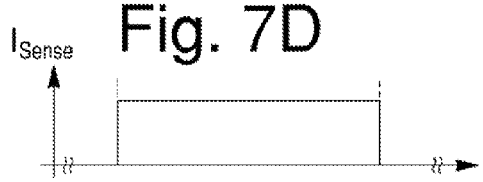
Figure 7G:
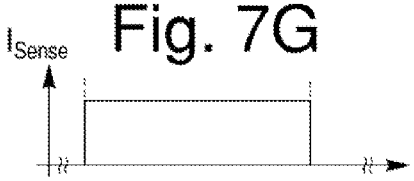
Figure 7E:
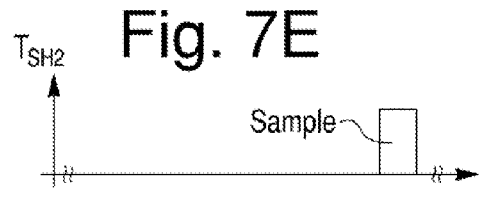
Figure 7H:

In a SAC converter, the current sampling may continue to use the turn OFF of switch S2 120 until the duration of the PTI becomes greater than or equal to $T_R/4$, corresponding to the time during each half-period at which the peak value of the sinusoidal primary current is at a maximum. Thereafter, sampling of the peak current may be done at a time $T_R/4$ after the PTI has started (instead of when switch S2 120 turns OFF). Thus, for a SAC converter, the high frequency inrush current limiting method may comprise the following algorithm:
  1. Begin converter operation with a power transfer interval duration that is shorter than normal, e.g. $T_{PTI-N}< T_{PTI-OP}=T_R/2$, at an operating frequency, fa, that may be lower than, equal to, or higher than the normal operating frequency, $F_{op}$ depending on the existence and duration of clamp phases.
  2. Sample the primary current at the first to occur of: (a) the end of the power transfer interval, e.g. when switch S2 120 turns OFF (as shown in FIGS. 7C-7E); or (b) a time equal to $T_R/4$ after the start of the PTI (as shown in FIGS. 7F-7H), i.e. at the zero-crossing of the magnetizing current, at the midpoint of a normal power transfer interval.
  3. When the peak input current fails to exceed a maximum current threshold, $I_{Th}$, increase the PTI duration incrementally, e.g. $T_{TPI-N+1}=T_{TPI-N}+\Delta T$.
  4. Continue steps 2 and 3 until the duration of the PTI has been increased to the norm, i.e. until $T_{TPI-N+1}=T_{PTI-OP}=T_R/2$.

In FIG. 7B, the length of the half-period is shown to exceed $T_R/4$ after time tw. In accordance with the SAC truncated PTI (high frequency) inrush current limiting method, the samples (FIGS. 7G, 7H) are not taken when switch S2 120 is turned OFF (e.g., at time Td), but are taken at time $T_R/4$, corresponding to the time of peak primary current flow.

Because a SAC power train with a low leakage inductance transformer may require significant reduction, e.g. by a factor of 10, of the PTIs during start up with large capacitive loads, high frequency operation with relatively constant duty cycle can result in greatly increased current demands by the control circuitry, e.g. ten times the nominal control current levels, which may in turn require oversized internal voltage regulators. It may therefore be advantageous and more efficient to operate the power train with truncated PTIs at or near the normal operating frequency, i.e. by increasing the duration of the clamp phases (described below) as the PTI are shortened during startup. Shorter power transfer intervals may require adjustment of the secondary gate driver circuitry to allow for short pulses. Alternatively, where the ring-up and ring-down times and minimum pulse hold times for the secondary drivers do not allow the secondary switches to respond to very short PTIs, the body diodes of the secondary switches (MOSFETs) may be used to rectify the output voltage, i.e. during initial startup. Use of the body diodes works particularly well for converters delivering higher output voltages, such as bus converters.

B. Regulated Gate Drive

Because MOSFET gate drive power may increase with increasing converter operating frequency, implementation of the high frequency inrush current limiting method may require that gate driver circuitry be scaled up to handle the higher transient gate power required during inrush. This scaled-up circuitry may operate less efficiently at the normal operating frequency, $F_{op}$, than might circuitry designed to operate at a lower fixed frequency, $F_{op}$.

Figure 10:
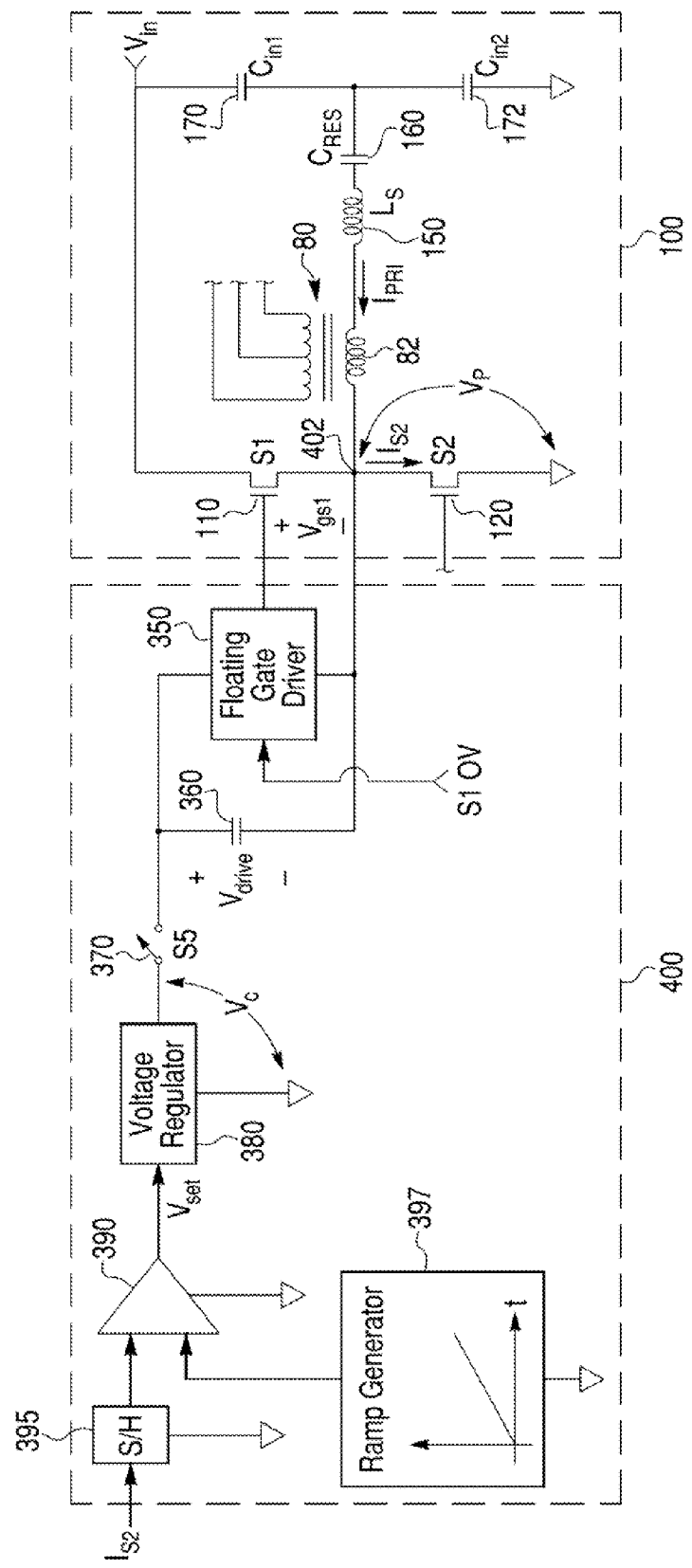
FIG. 10 shows a block diagram of an inrush current limiting circuit for use with a sine amplitude converter.

FIG. 10 shows a block diagram of an inrush current limiting circuit 400 for use with SAC power conversion circuitry 100 operating at the normal converter operating frequency, $F_{op}$. Unlike the truncated PTI current limiting described above, the current limiting in FIG. 10 fixes the converter operating frequency at $F_{op}$. Thus, the SAC switches S1 110 and S2 120 (shown in FIG. 10) are turned ON and OFF as described above in connection with the digital controller (220 in FIG. 4) and with the timing illustrated in FIGS. 3C and 3D. The secondary switches S3 130 and S4 140 (not shown in FIG. 10) are also operated in the same way as described above.

Switch S5 370 may be turned ON when switch S2 120 is ON and may be turned OFF prior to switch S2 120 being turned OFF and the ensuing ZVS transition of switch S1 110 prior to turn ON. When OFF, switch S5 370 prevents the rising voltage at Vp from propagating back into the ground-referenced circuitry within the inrush limiting circuitry 400. When switch S2 120 is ON, primary node 402 is connected to ground through the small resistance of switch S2 120 and a ground-referenced feedback loop is formed comprising sample-and-hold circuit 395, error amplifier 390, adjustable voltage regulator 380, switch S5 370 (which is ON), and floating gate driver 350. As described earlier, the sample-and-hold circuit 395 receives a measurement (which may include sensing the voltage Vp across switch S2 120) indicative of the current, $I_{s2}$, flowing in switch S2 120 when it is ON. The set-point for the feedback loop may be provided by a constant level source (not shown) or by a ramp generator 397, which may provide an output ramp that starts at a predetermined starting level (e.g., zero) and ends at a predetermined ending level. The rate-of-change of the ramp may be relatively slow so that the incremental change in the current set-point is small during each converter operating cycle. Inrush current ramping may be used to keep the power dissipation in switch S1 110 during inrush current limiting at a constant level to reduce heating during startup.

In operation, the sample-and-hold circuit 395 samples $I_{S2}$ at the midpoint of the switch S2 120 power transfer interval, corresponding to the zero-crossing of the magnetizing current as described earlier. Error amplifier 390 compares the sampled value of $I_{S2}$ to the output of ramp generator 397 and delivers an error voltage, Vset, to the set-point input of adjustable voltage regulator 380. With switches S5 370 and S2 120 ON, the voltage regulator 380 regulates the voltage, Vdrive, across storage capacitor 360, which holds the voltage, Vdrive, while switches S2 120 and S5 370 are OFF. Switch S5 370 may be turned OFF when switch S2 120 is turned OFF.

With switch S2 120 OFF (and switch S5 370 OFF), the controller may begin conduction of switch S1 110 by asserting the "S1 ON" control signal (at time t1 in FIGS. 3C, 3G) as described above. The floating gate driver 350 connected to drive the gate of switch S1 110 drives the gate of switch S1 110 with a voltage proportional to the voltage Vdrive held by capacitor 360. The gate voltage of switch S1 110, Vgs1, may be substantially equal to Vdrive for some circuits, however, using the resonant gate drive circuit discussed below, the gate voltage may be substantially equal to twice Vdrive. The feedback loop adjusts Vdrive to a value that is just sufficient to enable the sampled value of $I_{S2}$ to follow the output of the ramp generator 397. It does so by adjusting Vdrive (and, therefore, Vgs1) so that the channel resistance of switch S1 110 is at a value consistent with limiting the MOSFET current to the set-point value. Thus, rather than fully enhancing switch S1 110 into a fully ON state, in which the channel resistance of the MOSFET is relatively low and insensitive to variations in Vgs1, during inrush limiting the feedback loop operates the MOSFET within its "saturation" region, in which the channel resistance is a strong function of Vgs1. By this means, the current is controlled to increase, in a pre-determined fashion determined by the ramp generator, and an inrush current surge may be prevented.

As the input current increases the converter output voltage will also increase. When the converter output voltage reaches some pre-determined value, the inrush current limiting process may be terminated. One way to sense the relative value of the output voltage is to measure the primary voltage, Vp, when the current in the switches has returned to zero (e.g., at time t6, FIG. 3), because Vp is substantially equal to the primary-reflected value of Vout at that time. Once the inrush limiting process is terminated, normal converter operation may be initiated by increasing Vdrive to a value consistent with operating switch S1 110 in its fully ON state. One way to increase Vdrive is to force the output of the voltage regulator 380 to an appropriate pre-determined value; another way is to provide an alternate source of power to the floating gate drive circuit.

Alternate embodiments of the circuitry of FIG. 10 are possible. For example, sampling and measurement of Is2 may be implemented using the technique described above with reference to FIG. 5. The error amplifier function may be implemented digitally, as may the ramp generator function.

IV. Gate Driver

Figure 8:
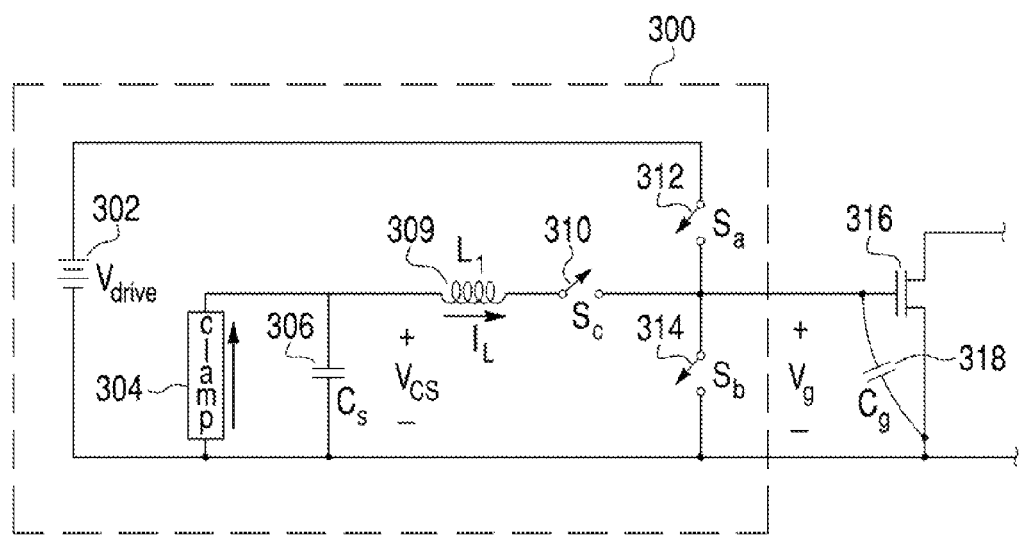
FIG. 8 shows a gate driver circuit.

A gate driver circuit 300 for efficiently driving the gate-control input of MOS-gated switching devices such as MOSFETs or IGBTs suited for use in the primary and secondary gate drivers 250, 260 shown in FIG. 2, will be described in connection with FIG. 8. A MOS-gated device 316 to be controlled by the driver circuit 300 is shown having an input capacitance, Cg, represented by gate capacitor 318 in FIG. 8. The driver 300 itself includes a storage capacitor 306, having a capacitance substantially larger than the gate capacitor 318; a resonant inductor L1 309; a clamp circuit 304; switches Sa 312, Sb 314 and Sc 310; and is fed by a voltage source 302, which supplies a voltage, Vdrive, for turning the MOS-gated switch 316 ON. Waveforms illustrating the operation of the gate driver circuit 300 are provided in FIGS. 9A through 9E. Initially, i.e. at a time just prior to time t0: storage capacitor Cs 306 is charged to a voltage, $V_{CS}$, approximately equal to $V_{Drive}/2$; switches Sa 312 and Sc 310 are OFF; and switch Sb 314 is ON, shunting the gate capacitor 318 and maintaining the gate voltage, Vg, at zero volts (and switch 316 OFF).

Figure 9A:
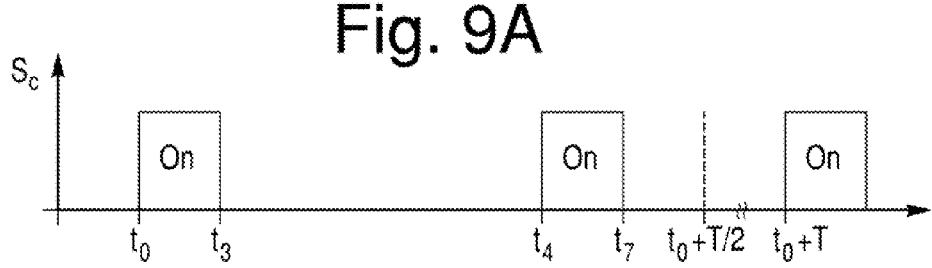
FIG. 9A through 9E show waveforms for the gate driver circuit of FIG. 8.
Figure 9B:
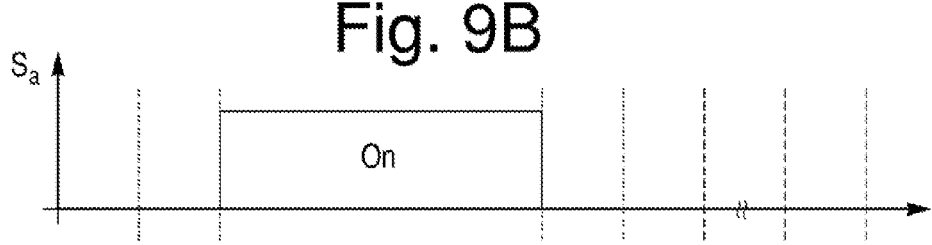
Figure 9C:
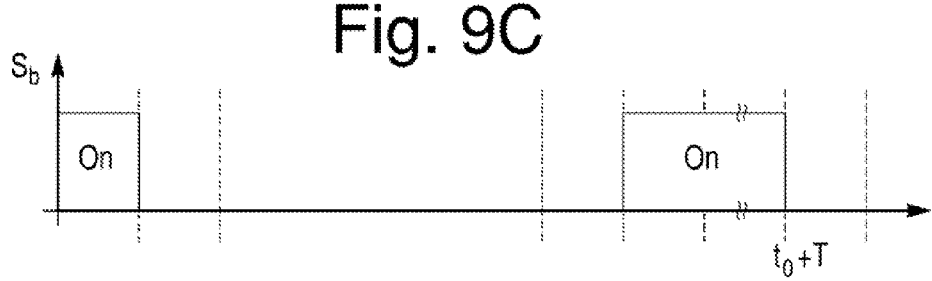
Figure 9D:
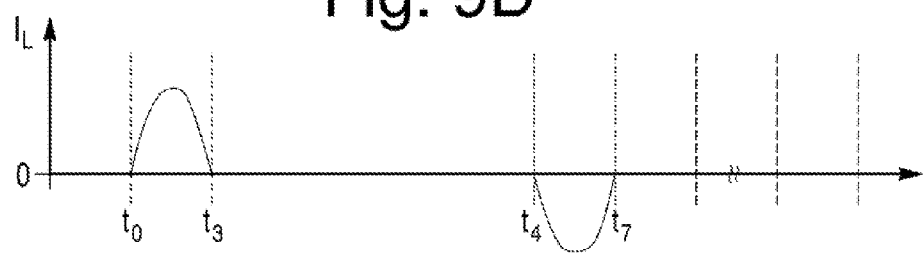
Figure 9E:
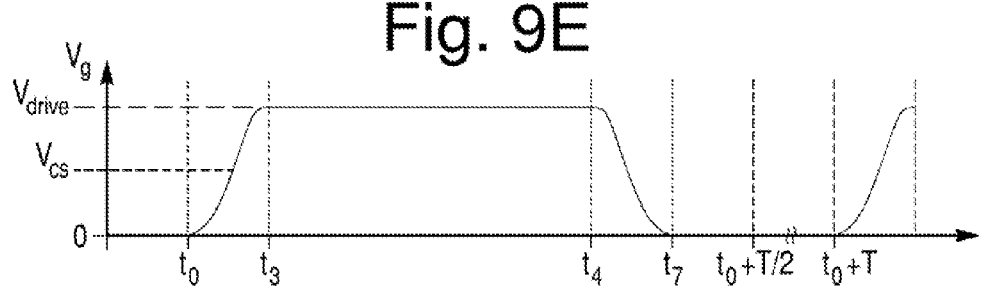

Turn 316 ON:

At time t0, switch Sb 314 may be turned OFF (allowing the gate capacitor to be charged) and switch Sc 310 may be turned ON, initiating a resonant transfer of energy from storage capacitor 306 (which has been charged $V_{CS}$=to $V_{Drive}/2$ volts) into gate capacitor 318, via inductor L1 308, the resonant period, T2, of which will be determined primarily by the gate capacitance, Cg, and the inductance, L1, assuming that the storage capacitance is much greater than the gate capacitance: $T2=2\pi\sqrt{(L1*Cg)}$. During the time that switch Sc 310 is ON, an essentially sinusoidal current flows in the inductor L1 308, as shown in FIG. 9D. At time t3 (t3=t0+T2/2), the inductor current returns to zero and the gate voltage, Vg, has rung up to essentially $2*V_{CS}=V_{Drive}$ (FIG. 9E). Ideally, the voltage, Vg, across Cg will have rung all the way up to $V_{Drive}=2*V_{CS}$; however, losses that may have occurred during the resonant energy transfer, a difference between the voltage across Cs 306, $V_{CS}$, and the value of $V_{Drive}/2$, or both may cause the gate voltage, Vg, to ring up to a value that is less than the voltage, $V_{Drive}=2*V_{CS}$.

Hold 316 ON:

At time t3, switch Sc 310 may be turned OFF (disconnecting the inductor L1 308 and storage capacitor 306 from the gate and terminating the resonant transfer), and switch Sa 312 is turned ON connecting the gate to $V_{Drive}$. As shown in FIG. 9E, there may be a (small) step in Vg when switch Sa 312 is turned ON at time t3 as the gate fully charges to $V_{Drive}$. Switch Sa 312 may remain ON from time t3 and to t4 keeping the gate voltage, Vg equal to $V_{Drive}$ (and switch 316 ON).

Turn 316 OFF:

At time t4, switch Sa 312 may be turned OFF permitting the gate capacitor to be discharged (to turn OFF switch 316), and switch Sc may be turned ON, initiating a resonant transfer of energy from gate capacitor 318 into storage capacitor 306, via inductor L1 308. During the interval that switch Sc 310 is ON from time t4 to t7, an essentially sinusoidal current flows in the opposite direction through inductor L1 308, as shown in FIG. 9D. At time t7 (t7=t4+T2/2), the inductor current returns to zero and the voltage Vg has rung down to a value essentially equal to zero.

Hold 316 OFF:

At time t7, switch Sc 310 may be turned OFF (disconnecting the inductor L1 308 and storage capacitor 306 from the gate and terminating the resonant transfer), and switch Sb 314 may be turned ON, shunting the gate and bringing the voltage Vg to essentially zero volts. Ideally, the voltage Vg across the gate capacitor will have rung all the way down to zero, however, as noted above losses that may have occurred during the resonant energy transfer and mismatch between $V_{CS}$ and $V_{Drive}/2$ may result in the voltage Vg ringing down to a value that is slightly greater than zero. Thus, as indicated at time t7 in FIG. 9E, there may be a (small) step in Vg when switch Sb 314 is turned ON and the gate fully discharges to zero. Between time t7 and the beginning of the next operating at time t0+T, switch Sa 312 may remain ON shunting the gate capacitor and maintaining the gate voltage, Vg, at zero volts (and switch 316 OFF).

The clamp 304 may be used to guard against the voltage across the storage capacitor 306 creeping up to a value greater than $V_{Drive}/2$, e.g. due to extraneous charge being transferred into the capacitor by circuit noise coupling or other transient effects. The clamp 304 may be set to a predetermined clamp voltage, Vclamp, which may be slightly greater than $V_{Drive}/2$, to remove excess charge from the storage capacitor 306 while maintaining the capacitor at a voltage essentially equal to $V_{Drive}/2$.

The gate drive circuit 300 (FIG. 8) may be used advantageously in a converter of the kind illustrated in FIGS. 2 and 3 preferably with the resonant frequency of the gate drive, $F_{G-Res}$, being at least five times greater than the resonant frequency of the converter power train, $F_R$, ($F_{G-Res} \geq 5\ F_R$). Referring to FIG. 3E, the times labeled t0, t3, t4 and t7 may correspond to the same times illustrated in FIG. 9. Thus, a set of pre-determined set-points in the converter of FIG. 2 may be used to time the turning ON and OFF of the switches in a gate driver 300 of the kind illustrated in FIGS. 8 and 9. If gate drivers 300 are used for both primary and secondary gate drivers 250 and 260 in the converter of FIG. 2, adapted as necessary to the particular switches being driven, it may be possible to more accurately align the times at which converter switches turn ON and OFF, thereby increasing conversion efficiency.

V. Light Load Operation

As the power processed by the converter is reduced, for example during light-load or at the extreme no-load operation, the core losses and conduction losses become dominant, reducing overall converter efficiency. The primary winding current in the SAC is the sum of the load-dependent resonant current, $I_{res}$, and the magnetizing current: $I_{pri}=I_{res}+I_{mag}$. At no load, the magnetizing current, $I_{mag}$, dominates the current flowing in the primary winding.

A. High Frequency Operation

One way to reduce losses at low or no load recognizes that the magnetizing current, which is dependent on the primary reflected inductance, the input voltage, and the power transfer interval, decreases in inverse relation (which is faster that than proportionate) to increases in operating frequency. In other words, as the power transfer intervals are shortened the peak magnetizing current will decrease. As a result, the peak flux density in the core, being a function of the peak magnetizing current, also decreases in turn reducing core losses. As the level of magnetizing current decreases, the energy recycling intervals will become longer because the lower value of magnetizing current takes longer to charge and discharge circuit capacitances for the ZVS transitions. The increased duration of the ZVS transitions reduces the overall duty cycle of the power train beneficially compounding the reduction in duration of the power transfer intervals and magnetizing current.

The increase in effective winding resistance (proportional to the square root of increase in operating frequency) at the higher operating frequency has a small adverse effect on conduction losses, ($P_{d-cond}=I_{mag}^2*(R_{W-pri}+R_{FETS})$); however in comparison to the much greater reduction in magnetizing current and core losses, the increase is a tolerable tradeoff in reducing the total fixed losses. Because the gate-drive energy is recycled as described above, the operating frequency may be increased without significant penalty in switching losses. The controller may accordingly increase the converter operating frequency to improve the no-load efficiency, e.g. using the truncated power transfer intervals described above in connection with the current limiting mode of operation. By way of example, the controller may operate the power train at a no load operating frequency, $F_{op-0}$, that is twice the normal operating frequency, $F_{op-nom}$, resulting in greater than 50% reduction in core loss, greater than 50% reduction in winding losses, and greater than 50% reduction in conduction losses in the switches.

The controller may transition between two modes of operation, high-frequency operation and normal-frequency operation in a binary manner when predetermined conditions are detected. For example, when the load current, resonant portion of the primary current, or primary current reaches a predetermined threshold, e.g. $I_{res}>0$ or $I_{pri}>I_{Threshold}$ the controller may switch to operation using the normal (full) PTI (half of the resonant period), i.e. normal converter operating frequency, and when the load current or resonant portion of the primary current reaches a predetermined threshold, e.g. $I_{res}=0$ or $I_{pri}<I_{Threshold}$, the controller may switch to operation using the truncated PTI, i.e. high-frequency operation. The controller may provide for operation at several PTI durations, e.g. transitioning between high-frequency operation using a very short truncated PTI at no-load, to a lower, intermediate-frequency operation using a longer but still truncated PTI at light-load, and normal-frequency operation using the full PTI above a load-threshold. The number of PTI duration set-points may be increased as desired to provide for operation at various light load levels, switching PTI set-points as detected load conditions change. Alternatively, the controller may smoothly vary the duration of the PTI over a range, e.g. from a very short truncated PTI at no load to increasingly longer but still truncated PTIs at light load as the load increases. Because above some load level, the use of a truncated PTI will lead to greater losses than during normal operation, the controller may switch from the variable PTI duration to the normal (full) PTI duration when the detected primary current, or load current, or resonant current exceeds a threshold.

As noted above, current in the SAC primary winding is the sum of the load-dependent resonant current, $I_{res}$, and the magnetizing current: $I_{pri}=I_{res}+I_{mag}$. The magnetizing current, which peaks near the end of the power transfer intervals, prevents full zero current switching of the SAC primary switches. For example, in a SAC in which the primary resonant current reaches 10 amps peak at full load and the magnetizing current reaches 1 amp peak, the primary switches may be carrying 10% of the peak current when they are switched OFF at the end of the PTI, achieving 90% ZCS. As the load current increases above zero, the resonant current increases, which means that truncating the PTI, i.e. turning of the primary switches before the resonant current returns to zero at the end of the resonant half-period, will mean that both the magnetizing current and some of the resonant current will be flowing in the primary switches at a time when they are transitioned to OFF. At very light loads the ZCS error may be tolerable, but may cause objectionable increases in noise as the load increases. The level of current flowing in the primary switches may be used as another condition for limiting operation with truncated PTIs. The controller may for example use the truncated PTI mode of operation when a combination of operating conditions are satisfied and use the normal (full) PTI when they are not. For example, the controller may exit truncated PTI mode when the load current exceeds a threshold such as 15% of full load as described above; or additionally exit truncated PTI mode if the current in the primary switches is greater than or equal to 20% of the peak primary current at when the primary switches are turned OFF (at the end of the truncated PTI), or a combination of such criteria. The current monitor described above may be used to detect such conditions.

B. Low Frequency Clamp Operation

Figure 11:
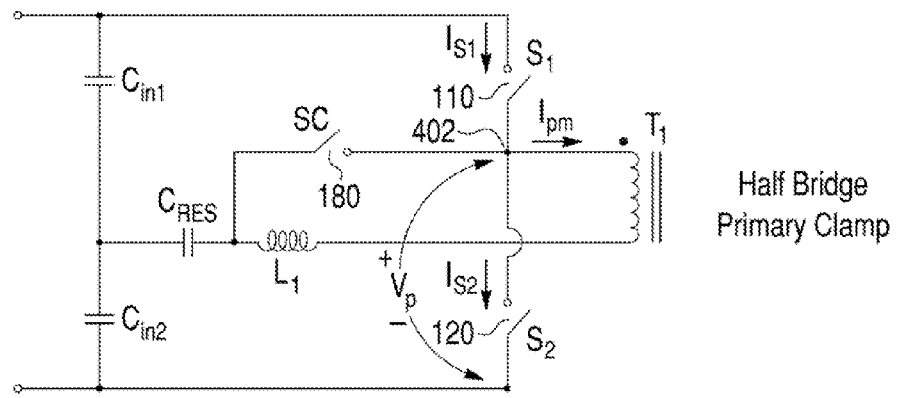
FIG. 11 shows a half bridge sine amplitude converter primary circuit with a clamp circuit.

Another method for reducing losses in the converter during light load operation (or alternatively to increase the effective output resistance of the converter, e.g. for inrush current limiting) is to clamp the primary or secondary winding of the transformer, elongating the converter operating period and lowering the operating frequency without changing the duration of the power transfer intervals and disrupting resonant operation. Referring to FIG. 11, a half-bridge primary-side SAC circuit is shown with a clamp switch SC connected across the primary winding (and leakage inductance or external inductance if any). The clamp switch SC, 180, is a bidirectional switch capable of blocking current in both directions. Because the clamp switch 180 SC will need only carry the magnetizing current, it may be much smaller than the primary switches, 51, S2. The clamp switch 180 SC may be turned ON to clamp the current in the transformer, essentially non-dissipatively for the time scale required, during a clamp phase suspending power processing in the converter operating cycle. Introduction of the clamp phase(s) lowers the effective operating frequency and lowering the effective duty cycle reduces the fixed converter losses.

Operation of the clamp will be described with reference to the waveforms shown in FIGS. 14A-14G which depict selected portions, but not necessarily all, of the respective waveforms. For example, FIGS. 14D through 14F show current waveforms through switches S1, S2 and SC respectively without depicting the transitions immediately before or after the selected portions.

Figure 14A:
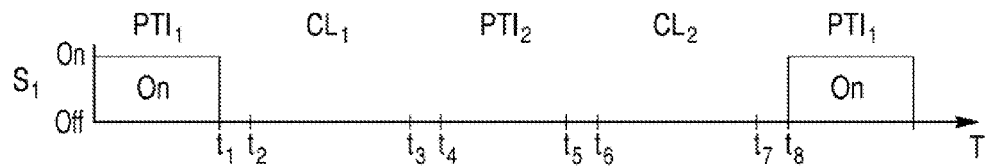
FIG. 14A through FIG. 14G show waveforms for a converter with the primary circuit of FIG. 11.
Figure 14B:
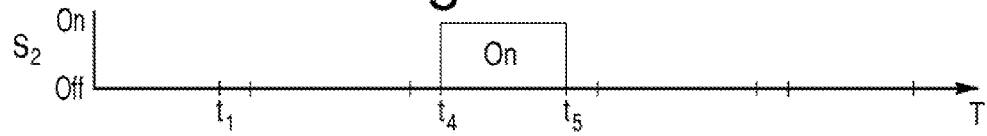
Figure 14C:
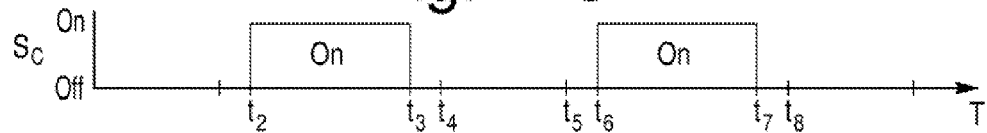
Figure 14D:
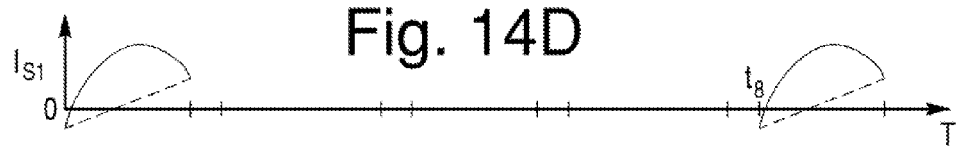
Figure 14E:
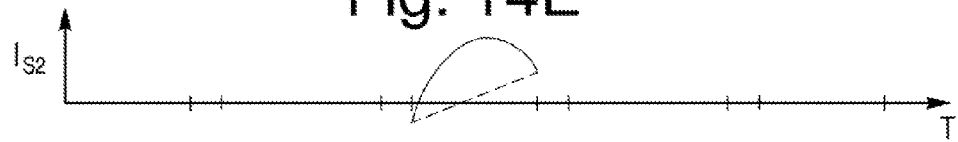
Figure 14F:
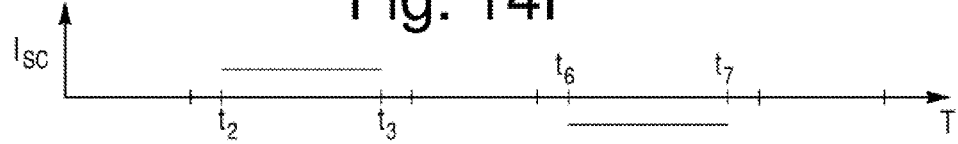

At time t0, switch S1 may be turned ON initiating a first power transfer interval, $PTI_1$, as shown in FIG. 14A. As shown in FIGS. 14A-14G, the duration of the PTIs are one half of the resonant period at the end of which (e.g. times t1, t5) the resonant portion of the primary current (FIG. 14G) returns to zero and the magnetizing current (dashed line) reaches a peak.

At time t1, switch S1 may be turned OFF (FIG. 14A) ending the first power transfer interval $PTI_1$, allowing the magnetizing current to begin charging and discharging the capacitances at node 402 during a first energy recycling interval, ER1. The magnetizing current is shown declining during the first ER1 (t1 to t2). The voltage across the clamp switch 180 may be reduced to a minimum, preferably zero, during the first energy recycling interval ER1, in preparation for the first clamp phase CL1. The voltage Vp across primary switch S2 is also reduced in partial preparation of the next power transfer interval, $PTI_2$.

Figure 14G:
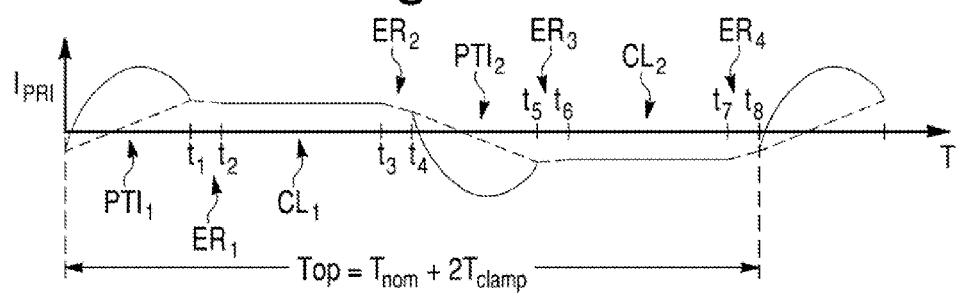

At time t2, preferably when the voltage across the clamp switch reaches essentially zero volts, the clamp switch 180 SC may be turned ON (FIG. 14C, FIG. 14F) trapping the magnetizing current, $I_{mag}$, in the primary winding 82 (any external inductance 150 and any primary reflected inductances), i.e. the magnetizing energy is trapped in the transformer and primary reflected inductances. The duration of the clamp phase may be as long as necessary, but preferably not so long as to result in significant dissipation of the magnetizing current. As shown in FIG. 14G, the primary current is shown declining slightly over the course of the clamp phase.

At time t3, the clamp switch 180 SC may be opened ending the first clamp phase and allowing the trapped magnetizing current to resume charging and discharging the capacitances at node 402 (as shown by the slight decline in magnetizing current in FIG. 14G) during a second energy recycling interval, ER2. The second energy recycling interval ER2, may be used to reduce the voltage across primary switch S2 to a minimum, preferably zero, completing the ZVS transition in preparation of the next power transfer interval, $PTI_2$.

At time t4, primary switch S2 may be turned ON (FIG. 14B) when the voltage Vp at node 402 reaches a minimum, preferably zero, beginning the next power transfer interval, $PTI_2$ (FIG. 14G).

At time t5, primary switch S2 may be turned OFF (FIG. 14B) ending the second power transfer interval, $PTI_2$, and allowing the magnetizing current to charge and discharge the capacitances at node 402 (as depicted by a slight decline in magnetizing current in FIG. 4G) during a third energy recycling interval, ER3. The voltage at node 402 may be increased reducing the voltage across the clamp switch 180 SC to a minimum, preferably zero, in preparation for the next clamp phase, CL2 during the third energy recycling interval. The voltage Vp across primary switch S1 is also reduced in partial preparation of the next power transfer interval, $PTI_1$.

At time t6, preferably when the voltage across the clamp switch 180 SC reaches essentially zero volts, the clamp switch 180 SC may be turned ON (FIG. 14C, 14F) trapping the magnetizing current, $I_{mag}$, in the primary winding 82 and any external inductance 150 beginning a second clamp phase. The duration of the second clamp phase may preferably be made commensurate with the duration of the first clamp phase for symmetrical converter operation. As shown in FIG. 14G, the primary current is shown declining slightly over the course of the second clamp phase.

At time t7, the clamp switch 180 SC may be opened (FIG. 14C, FIG. 14F) ending the second clamp phase and allowing the trapped magnetizing current to resume charging and discharging the capacitances at node 402 during a fourth energy recycling interval, ER4. The fourth energy recycling interval ER4, may be used to reduce the voltage across primary switch S1 to a minimum, preferably zero, completing the ZVS transition in preparation of the next power transfer interval, $PTI_1$ which is also the beginning of the next converter operating cycle.

In this manner the clamp phase (clamp switch engaged) may be employed to reduce the operating frequency of the converter, reducing the fixed losses per unit time by virtue of a reduced number of operating cycles. For example, the duration of the clamp phases may be increased as the load (sensed using the above described current monitor) decreases for reducing power dissipation during light load operation. The clamp phased may also be adjusted to control inrush current during start-up operation. For example, in a SAC having a normal operating period, $T_{nom}$, operated with full power transfer intervals, $T_{PTI}=T_{res}/2$, and the output resistance, $R_{out}$, may be doubled by introducing a clamp time per cycle, $T_{clamp}=1/2\ T_{op}$, and quadrupled the effective output resistance of the converter, $R_{out}$, may be doubled using a $T_{clamp}=\frac{3}{4}\ T_{op}$. The clamp phase may also be used to adjust the output resistance to compensate for changes in temperature or adjust the loadline for power sharing arrays. For example the controller may sense the converter operating conditions, including the temperature and introduce a clamp phase or adjust the clamp phase duration to maintain a desired level of output resistance. The clamp phase may be used to control the operating frequency with truncated PTIs, e.g. keeping the converter operating frequency constant while adjusting the PTI duration for in-rush current limiting or light load operation.

Figure 12:
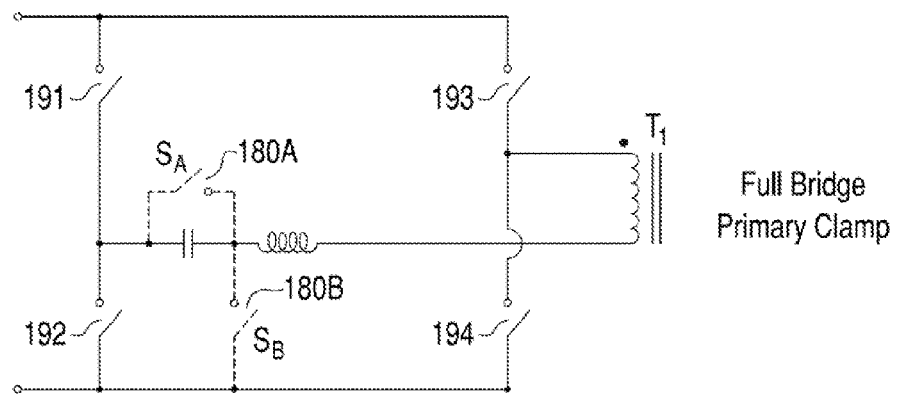
FIG. 12 shows a full bridge sine amplitude converter primary circuit with a clamp circuit.
Figure 13:
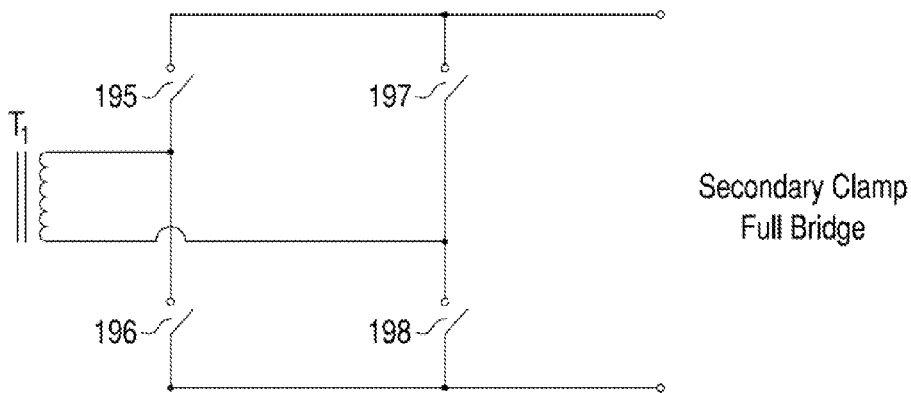
FIG. 13 shows a full bridge sine amplitude secondary circuit that may be also used to clamp a sine amplitude converter.

Alternative embodiments of clamped SAC topologies are shown in FIGS. 12 and 13. A SAC primary circuit as shown in FIG. 12 includes primary switches 191, 192, 193, 194 for driving the resonant circuit including the transformer primary winding 82 in a full-bridge configuration. The full bridge configuration allows the primary switches to be turned ON in pairs to form a clamp, e.g. switches 192 and 194, or alternatively switches 191 and 193, across the resonant circuit. However, because the resonant capacitor is in series with the transformer an auxiliary clamp switch SA 180A as shown in FIG. 12 may be connected across the resonant capacitor to complete the clamp circuit. Alternatively, as shown in FIG. 12, an auxiliary clamp switch SB 180B may be used instead of switch SA. Alternatively as shown in FIG. 13, in embodiments having a full-bridge secondary configuration including secondary switches 195, 196, 197, and 198, pairs of the secondary switches, e.g. 196 and 198, or 195 and 197, may be used to clamp the secondary winding of the transformer eliminating the need for auxiliary clamp switches altogether.

VI. Cross-Isolation Control Interface

Referring to FIG. 15, the digital controller 200 of FIG. 2 may be implemented as separate primary-side 200A and secondary-side 200B controllers that may communicate across an isolation boundary 290 via a transformer 272 if necessary. Alternatively a direct connection shown as broken line 275 in FIG. 15 may be used if isolation between the primary and secondary side controllers is not required, eliminating transformer 272 and capacitor 273. The primary side controller 200A may be essentially the same as the controller 200 of FIG. 2, except the secondary gate drivers 260 are moved to the secondary side controller 200B and a coder 270 and driver 271 are added to the primary side controller 200A. The secondary side controller 200B also includes a decoder 280 and power rectifiers 281 and 282.

The waveforms of FIGS. 16A through 16H illustrate features of the interface signal (FIG. 16A) which provide power and synchronization information to the secondary side controller 200B. Referring to FIG. 3E, the times labeled t0, t3, t4 and t7 for the switch S3 control may correspond to the same times for switch S3 and analogous times for switch S4 illustrated in FIGS. 16A-H. The timing block 220 (FIG. 15) generates timing signals used to turn the primary and secondary switches ON and OFF as described above in connection with FIG. 2. In FIG. 15 however, a primary side coder 270 generates a binary interface signal from the signals for the secondary side switches (S3 and S4). The output of driver 271 (interface signal) may be connected to drive transformer 272 for isolation or directly to the input of the secondary controller for no isolation. The interface waveform (FIG. 16A) includes lower frequency components, e.g. from time t0 to t3, time t3 to t4, and t4 to t7 in each converter half cycle that when rectified by the power rectifiers 281 and 282 in the secondary side controller 200B provide bias power for operating the secondary side controller 200B.

The interface signal (FIG. 16A) additionally includes relatively fast synchronization transitions (shown between times ts and t0) in each converter half cycle that provide timing information. The synchronization transitions occur at a faster rate than any other transitions to facilitate easy detection by the decoder 280 in the secondary side controller 200B. The synchronization transitions also include a polarity that may be used to indicate the identity of the converter half cycle, i.e. the first half period or the second half period, and thus the identity of the secondary switch S3 or S4, respectively to be turned ON. A fast Lo-Hi-Lo transition during the interval from ts to t0 indicates the start at t0 of the first half period (HP1 in FIG. 16H) and a fast Hi-Lo-Hi transition during the interval from ts to t0 indicates the start at t0 of the second half period (HP2 in FIG. 16H).

The secondary side controller generates the appropriate control signals for the secondary switches S3 and S4 based upon the subsequent transitions. For example, the Lo-Hi transition at time t0 in HP1 initiates the transition of secondary switch S3 to the ON state. The control signals for the switches Sc (transition), Sa (ON), Sb (OFF) in gate driver 300 described above in connection with FIGS. 8 and 9 are shown in FIGS. 16B, 16C and 16D respectively for secondary switch S3. Gate driver switch Sc is turned ON at t0 beginning the transition from OFF to ON for switch S3. The Lo-Hi transition in interface signal at time t3, may be used by the decoder to turn switch Sc OFF and turn switch Sa ON (holding switch S3 ON). At time t4, the interface signal transitions Hi-Lo signaling to the decoder 280 to turn switch Sa OFF and switch Sc ON thus beginning the transition of switch S3 from ON to OFF. The timing for turning switch Sc OFF and switch Sb ON (holding switch S3 OFF), i.e. time t7, may be signaled by the next transition after t4, i.e. the Lo-Hi transition at time t7 (=$t_S$) in the interface signal as shown in FIGS. 16A-D during HP1. This technique for generating the t7 timing allows t7 to be independently programmed from other time points but because t7=$t_S$ it would be followed by the start of the next cycle by a small but constant delay precluding operation with a variable clamp phase. Alternatively, the decoder may generate the t7 timing using a measured duration of the preceding t0-t3 interval from time t4 (assuming that gate charge and discharge times are equal) allowing the primary side controller to insert a variable clamp interval ($T_{CL}$) after t7 and before the start of the next half-period as shown in FIGS. 16A-D in HP1 with the clamp phase (HP1 w/CL in FIG. 16H). A similar sequence of the opposite polarity may be used to operate secondary switch S4 as shown in FIGS. 16A, 16E, 16F, 16G and 16H.

A number of embodiments of the invention have been described. Nevertheless, it will be understood that various modifications may be made without departing from the spirit and scope of the invention. For example, the power conversion circuitry may use alternative primary circuits, such as a full-bridge primary circuitry. The primary and secondary gate drivers may be internal or external to the DSC. Combinations of the above described control methods may be deployed. For example, the controller may use high frequency operation together with a clamp phase for no-load and light load operation. Accordingly, other embodiments are within the scope of the following claims.

The invention claimed is:

1. A method of synchronously operating a power converter in a series of converter operating cycles, the converter having at least one primary switch to drive a resonant power train and at least one secondary switch, the resonant power train including a transformer and having a characteristic resonant frequency and period, the method comprising:
    providing an oscillator for generating clock signals at an oscillator frequency;
    generating timing control signals for each of a plurality of events based upon the clock signals in a (A) standard converter operating cycle, having a standard operating period and frequency, to:
    (i) turn the at least one primary switch ON and OFF at times when essentially zero voltage is impressed across the respective at least one primary switch and essentially zero resonant current is flowing in the respective at least one primary switch; and
    (ii) turn the at least one secondary switch ON and OFF at times when essentially zero current is flowing in the respective at least one secondary switch and essentially zero voltage is impressed across the respective at least one secondary switch; and
    wherein the oscillator frequency is preset, and
    the timing of the timing control signals for one or more selected events may be set independently of other timing control signals and events.

2. The method of claim 1 further comprising generating a current monitor trigger synchronized with a predetermined time during the converter operating cycle when a signal indicative of a current flowing in the converter may be sampled.

3. The method of claim 2 wherein the current monitor trigger is synchronized with a time at which a resonant current reaches a peak and a magnetizing current is essentially zero.

4. The method of claim 2 wherein the current monitor trigger is synchronized with a time that follows the start of the ON time of the at least one primary switch by approximately one fourth of the characteristic resonant period.

5. The method of claim 1 further comprising:
generating timing control signals based upon the clock signals in a (B) modified converter operating cycle, having a modified operating period and frequency, to:
(i) turn the at least one primary switch ON at times when essentially zero voltage is impressed across the respective at least one primary switch and essentially zero resonant current is flowing in the respective at least one primary switch;
(ii) turn the at least one primary switch OFF at selected times before a resonant current flowing in the respective at least one primary switch returns to zero.

6. The method of claim 5 wherein the selected times are determined by when a current flowing in the selected switch is expected to meet or exceed a predetermined threshold for current limiting.

7. The method of claim 5 wherein the selected times are determined by when a current flowing in the selected switch is expected to fall below a predetermined threshold for no-load or light-load operation.

8. The method of claim 5 wherein the modified operating frequency is greater than the standard operating frequency.

9. The method of claim 5 further comprising:
generating timing control signals based upon the clock signals to (C) turn selected switches in the converter ON to form a clamp phase during which at least one winding of the transformer is shunted by a low resistance circuit to essentially losslessly trap energy in the transformer during the clamp phase.

10. The method of claim 9 wherein the modified operating frequency is essentially equal to the standard operating frequency.

11. The method of claim 9 wherein a duration of the clamp phase is adjusted based upon the magnitude of a current flowing in the converter.

12. The method of claim 11 wherein the duration of the clamp phase is increased as the magnitude of the current flowing in the converter increases.

13. The method of claim 12 wherein the duration of the clamp phase is increased to increase the output resistance of the converter.

14. The method of claim 11 wherein the duration of the clamp phase is decreased as the magnitude of the current flowing in the converter decreases.

15. The method of claim 14 wherein the clamp phase is increased to reduce power dissipation for operation with a reduced load.

16. The method of claim 1 further comprising:
generating timing control signals based upon the clock signals to (B) turn selected switches in the converter ON to form a clamp phase during which at least one winding of the transformer is shunted by a low resistance circuit to essentially losslessly trap energy in the transformer during the clamp phase.

17. The method of claim 16 wherein a duration of the clamp phase is adjusted based upon the magnitude of a current flowing in the converter.

18. The method of claim 17 wherein the duration of the clamp phase is increased as the magnitude of the current flowing in the converter increases.

19. The method of claim 17 wherein the duration of the clamp phase is increased to increase the output resistance of the converter.

20. The method of claim 17 wherein the duration of the clamp phase is decreased as the magnitude of the current flowing in the converter decreases.

21. The method of claim 20 wherein the clamp phase is increased to reduce power dissipation for operation with a reduced load.

22. The method of claim 1 further comprising providing a gate drive circuit for operating selected switches in the converter and generating timing control signals based upon the clock signals to (a) initiate a transition of the selected switches from ON to OFF or OFF to ON, (b) hold the selected switches ON, and (c) hold the selected switches OFF.

23. The method of claim 22 further comprising adjusting the level of a control signal for the at least one primary switch to increase an effective resistance of the converter in a modified converter operating cycle.

24. The method of claim 22 further comprising adjusting the level of the control signal to maintain a desired current level in the converter.

25. The method of claim 22 further comprising adjusting the level of the control signal to maintain a desired power dissipation in the at least one primary switch.

26. The method of claim 22 wherein the gate drive circuit comprises a resonant circuit including a gate capacitance and having a characteristic resonant gate drive period, wherein the characteristic resonant gate drive period is at least five times less that the characteristic resonant period of the power train.

27. The method of claim 1 further comprising:
providing an encoder adapted to receive selected ones of the timing control signals for turning the at least one secondary switch ON and OFF and generate an interface signal comprising a synchronization signal for indicating the start of a half period, and timing features to signal (a) the start of a transition of the at least one secondary switch from OFF to ON, (b) the start of holding the at least one secondary switch ON, and (c) the start of holding the at least one secondary switch OFF.

28. The method of claim 27 wherein the interface signal further comprises a polarity signal adapted to indicate an identity of the half period.

29. The method of claim 27 further comprising:
providing a secondary side control circuit adapted to receive the interface signal and generate timing control signals for operating the at least one secondary switch including (a) the start of a transition of the at least one secondary switch from OFF to ON, (b) the start of holding the at least one secondary switch ON, and (c) the start of holding the at least one secondary switch OFF;
the secondary side control circuit being further adapted to derive power for operation from the interface signal.

30. The method of claim 29 wherein the secondary side control circuit is further adapted to measure aspects of the interface signal to generate timing control signals not encoded in the interface signal.

31. The method of claim 1 wherein the generating timing control signals based upon the clock signals further comprises:
counting the clock signals from the oscillator;
setting a count threshold for each event;

generating the respective timing control signal for each event as the counting matches the respective count threshold.

32. The method of claim 31 wherein the oscillator and timing events are open-loop with respect to the power train.

33. The method of claim 31 wherein the oscillator or timing events are adjusted with feedback from measurements in the power train.

34. The method of claim 33 wherein the measurements and adjustments are performed during the manufacturing process.

35. The method of claim 33 wherein the measurements and adjustments are performed during operation as part of a closed-loop feedback system.

\* \* \* \* \*